United States Patent
Rukonic et al.

(10) Patent No.: US 7,966,329 B1
(45) Date of Patent: Jun. 21, 2011

(54) METHOD AND SYSTEM FOR RECOGNITION AND CATEGORIZATION OF FINANCIAL TRANSACTIONS

(75) Inventors: Marko Rukonic, San Jose, CA (US); Suresh R. Rao, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 523 days.

(21) Appl. No.: 12/182,731

(22) Filed: Jul. 30, 2008

Related U.S. Application Data

(63) Continuation-in-part of application No. 11/833,206, filed on Aug. 2, 2007.

(51) Int. Cl.
*G06F 17/30* (2006.01)
(52) U.S. Cl. .................. 707/737; 707/950; 705/35
(58) Field of Classification Search .......... 707/737, 707/950; 705/35
See application file for complete search history.

(56) References Cited

U.S. PATENT DOCUMENTS

| | | | |
|---|---|---|---|
| 5,583,763 A | 12/1996 | Atcheson et al. | |
| 5,842,185 A * | 11/1998 | Chancey et al. | 705/40 |
| 6,792,422 B1 | 9/2004 | Stride et al. | |
| 7,617,136 B1 * | 11/2009 | Lessing et al. | 705/28 |
| 7,624,073 B1 | 11/2009 | Robinson et al. | |
| 7,739,203 B2 * | 6/2010 | Kettner et al. | 705/400 |
| 2002/0173986 A1 | 11/2002 | Lehew et al. | |
| 2004/0254881 A1 | 12/2004 | Kumar et al. | |
| 2005/0289023 A1 | 12/2005 | Hahn-Carlson et al. | |
| 2006/0101323 A1 * | 5/2006 | Satyavolu | 715/501.1 |
| 2006/0224558 A1 | 10/2006 | Flora et al. | |
| 2007/0055597 A1 | 3/2007 | Patel et al. | |
| 2008/0103949 A1 * | 5/2008 | Lobana et al. | 705/35 |
| 2008/0172466 A1 | 7/2008 | Tonegawa et al. | |
| 2008/0249936 A1 * | 10/2008 | Miller et al. | 705/40 |

OTHER PUBLICATIONS

Search Report for Application No. GB0812569.2, dated Jan. 9, 2009, 1 page.
Combined Search and Examination Report for Application No. GB0812569.2, dated Jan. 12, 2009, 2 pages.
Examination Report for Application No. GB0812569.2, dated Nov. 5, 2009, 2 pages.

* cited by examiner

*Primary Examiner* — Leslie Wong
(74) *Attorney, Agent, or Firm* — Osha • Liang LLP

(57) ABSTRACT

A method for categorizing financial transactions, that includes identifying a vendor of the first financial transaction. An attempt is made to categorize the transaction on a first categorization level complying with a first categorization scheme, then a second categorization level that complies with a second categorization scheme, and then a third categorization level that complies with a third categorization scheme. The first categorization scheme differs from the second categorization scheme. When the transaction cannot be categorized on a previous categorization level, the attempt is made for the next level and the second categorization level. The transaction is categorized on the third level. The method further includes displaying the vendor category.

25 Claims, 26 Drawing Sheets

|  | 402<br>Date | 404<br>Description | 406<br>Category | 408<br>Amount |
|---|---|---|---|---|
|  | Date | Description | Category | Amount |
| 410 Line 1 | 4/7/08 | Best Luck Inn |  | -$98.55 |
| 412 Line 2 | 4/10/08 | Jeffrey's Automotive |  | $1,500.00 |
| 414 Line 3 | 4/2/08 | Bank USA PAYMNT CREDIT CRD 0812 3854 634 812 |  | -$1,225.00 |
| 416 Line 4 | 4/2/08 | Bank USA PAYMNT CREDIT CRD 5256 4896 486 431 |  | -$958.00 |
| 418 Line 5 | 3/28/08 | Samson's Supermarket |  | -$152.80 |
| 420 Line 6 | 3/18/08 | Houston Furniture Store |  | -$599.65 |
| 422 Line 7 | 3/15/08 | Delicious Dessert Diner |  | -$34.65 |
| 424 Line 8 | 3/10/08 | Jeffrey's Automotive |  | $1,500.00 |
| 426 Line 9 | 3/8/08 | Samson's Supermarket |  | -$8.00 |
| 428 Line 10 | 3/2/08 | Bank USA PAYMNT CREDIT CRD 0812 3854 634 812 |  | -$1,563.56 |
| 430 Line 11 | 3/2/08 | Happy Frog Store |  | -$32.50 |
| 432 Line 12 | 3/1/08 | Bank USA PAYMNT CREDIT CRD 5256 4896 486 431 |  | -$652.08 |
| 434 Line 13 | 2/28/08 | Houston Furniture Store |  | -$35.16 |
| 436 Line 14 | 2/27/08 | Delicious Dessert Diner |  | -$25.31 |
| 438 Line 15 | 2/12/08 | FIT MEM DUE |  | -$53.40 |
| 440 Line 16 | 12/11/08 | The Bistro at Swan Inn |  | -$98.52 |

400 Transaction Listing

FIGURE 7A

450 User Categorization Preferences

| | 452 Description | 453 Category | 454 Category |
|---|---|---|---|
| | Description | Category | Timestamp |
| 455 Line 1 | FIT MEM DUE | Gym | 2006-08-09 14-27-01 |
| 456 Line 2 | FIT MEM DUE | Gym Membership | 2007-05-11 07-52-32 |

FIGURE 7B

460 Collaborative Categorization Data

| | 462 Description | 464 Category 1 | 466 Score 1 | 468 Category 2 | 470 Score 2 |
|---|---|---|---|---|---|
| | Description | Category | Score | Category | Score |
| 472 Line 1 | Best Luck Inn | Lodging | 12 | Employer | 5 |
| 474 Line 2 | Jeffrey's Automotive | Automotive Repair | 8 | Automotive Parts Retail | 6 |
| 476 Line 3 | Happy Frog Store | Gift Shop | 2 | | |
| 478 Line 4 | Houston Furniture Store | Retail | 60 | Repair | 35 |
| 480 Line 5 | Samson's Supermarket | Supermarket | 62 | Bakery | 18 |

FIGURE 7C

| | 484<br>Merchant | 486<br>Category | 482<br>Merchant List |
|---|---|---|---|

| | Merchant Name | Category |
|---|---|---|
| 487 Line 1 → | Best Luck Inn | Travel |
| 488 Line 2 → | My Shoe Depot | Retail |
| 489 Line 3 → | Bank USA | Transfer |

FIGURE 7D

490 Term-Based Categorization Data

| | 492<br>Term | 494<br>Category |
|---|---|---|

| | Term | Category |
|---|---|---|
| 495 Line 1 → | Diner | Restaurant |
| 496 Line 2 → | Inn | Lodging |
| 497 Line 3 → | Bistro | Restaurant |

FIGURE 7E

|  | 402<br>Date | 404<br>Description | 406<br>Category | 408<br>Amount |
|---|---|---|---|---|
|  | Date | Description | Category | Amount |
| 410 Line 1 | 4/7/08 | Best Luck Inn | Lodging | -$98.55 |
| 412 Line 2 | 4/10/08 | Jeffrey's Automotive |  | $1,500.00 |
| 414 Line 3 | 4/2/08 | Bank USA PAYMNT CREDIT CRD  0812 3854 634 812 |  | -$1,225.00 |
| 416 Line 4 | 4/2/08 | Bank USA PAYMNT CREDIT CRD  5256 4896 486 431 |  | -$958.00 |
| 418 Line 5 | 3/28/08 | Samson's Supermarket |  | -$152.80 |
| 420 Line 6 | 3/18/08 | Houston Furniture Store |  | -$599.65 |
| 422 Line 7 | 3/15/08 | Delicious Dessert Diner |  | -$34.65 |
| 424 Line 8 | 3/10/08 | Jeffrey's Automotive |  | $1,500.00 |
| 426 Line 9 | 3/8/08 | Samson's Supermarket |  | -$8.00 |
| 428 Line 10 | 3/2/08 | Bank USA PAYMNT CREDIT CRD  0812 3854 634 812 |  | -$1,563.56 |
| 430 Line 11 | 3/2/08 | Happy Frog Store |  | -$32.50 |
| 432 Line 12 | 3/1/08 | Bank USA PAYMNT CREDIT CRD  5256 4896 486 431 |  | -$652.08 |
| 434 Line 13 | 2/28/08 | Houston Furniture Store |  | -$35.16 |
| 436 Line 14 | 2/27/08 | Delicious Dessert Diner |  | -$25.31 |
| 438 Line 15 | 2/12/08 | FIT MEM DUE |  | -$53.40 |
| 440 Line 16 | 12/11/08 | The Bistro at Swan Inn |  | -$98.52 |

400 Transaction Listing

FIGURE 7F

|  | 402<br>Date | 404<br>Description | 406<br>Category | 408<br>Amount |
|---|---|---|---|---|
| 410 Line 1 | 4/7/08 | Best Luck Inn | Lodging | -$98.55 |
| 412 Line 2 | 4/10/08 | Jeffrey's Automotive | Automotive Repair | $1,500.00 |
| 414 Line 3 | 4/2/08 | Bank USA PAYMNT CREDIT CRD 0812 3854 634 812 | | -$1,225.00 |
| 416 Line 4 | 4/2/08 | Bank USA PAYMNT CREDIT CRD 5256 4896 486 431 | | -$958.00 |
| 418 Line 5 | 3/28/08 | Samson's Supermarket | | -$152.80 |
| 420 Line 6 | 3/18/08 | Houston Furniture Store | | -$599.65 |
| 422 Line 7 | 3/15/08 | Delicious Dessert Diner | | -$34.65 |
| 424 Line 8 | 3/10/08 | Jeffrey's Automotive | Automotive Repair | $1,500.00 |
| 426 Line 9 | 3/8/08 | Samson's Supermarket | | -$8.00 |
| 428 Line 10 | 3/2/08 | Bank USA PAYMNT CREDIT CRD 0812 3854 634 812 | | -$1,563.56 |
| 430 Line 11 | 3/2/08 | Happy Frog Store | | -$32.50 |
| 432 Line 12 | 3/1/08 | Bank USA PAYMNT CREDIT CRD 5256 4896 486 431 | | -$652.08 |
| 434 Line 13 | 2/28/08 | Houston Furniture Store | | -$35.16 |
| 436 Line 14 | 2/27/08 | Delicious Dessert Diner | | -$25.31 |
| 438 Line 15 | 2/12/08 | FIT MEM DUE | | -$53.40 |
| 440 Line 16 | 12/11/08 | The Bistro at Swan Inn | | -$98.52 |

400 Transaction Listing

FIGURE 7G

|   | Date | Description | Category | Amount |
|---|---|---|---|---|
| | | 402 Date | 404 Description | 406 Category | 408 Amount |

| | Date | Description | Category | Amount |
|---|---|---|---|---|
| 410 Line 1 | 4/7/08 | Best Luck Inn | Lodging | -$98.55 |
| 412 Line 2 | 4/10/08 | Jeffrey's Automotive | Automotive Repair | $1,500.00 |
| 414 Line 3 | 4/2/08 | Bank USA PAYMNT CREDIT CRD 0812 3854 634 812 | Transfer | -$1,225.00 |
| 416 Line 4 | 4/2/08 | Bank USA PAYMNT CREDIT CRD 5256 4896 486 431 | Transfer | -$958.00 |
| 418 Line 5 | 3/28/08 | Samson's Supermarket | | -$152.80 |
| 420 Line 6 | 3/18/08 | Houston Furniture Store | | -$599.65 |
| 422 Line 7 | 3/15/08 | Delicious Dessert Diner | | -$34.65 |
| 424 Line 8 | 3/10/08 | Jeffrey's Automotive | Automotive Repair | $1,500.00 |
| 426 Line 9 | 3/8/08 | Samson's Supermarket | | -$8.00 |
| 428 Line 10 | 3/2/08 | Bank USA PAYMNT CREDIT CRD 0812 3854 634 812 | Transfer | -$1,563.56 |
| 430 Line 11 | 3/2/08 | Happy Frog Store | | -$32.50 |
| 432 Line 12 | 3/1/08 | Bank USA PAYMNT CREDIT CRD 5256 4896 486 431 | Transfer | -$652.08 |
| 434 Line 13 | 2/28/08 | Houston Furniture Store | | -$35.16 |
| 436 Line 14 | 2/27/08 | Delicious Dessert Diner | | -$25.31 |
| 438 Line 15 | 2/12/08 | FIT MEM DUE | | -$53.40 |
| 440 Line 16 | 12/11/08 | The Bistro at Swan Inn | | -$98.52 |

400 Transaction Listing

FIGURE 7H

|   | 402<br>Date | 404<br>Description | 406<br>Category | 408<br>Amount |
|---|---|---|---|---|
|   | Date | Description | Category | Amount |
| 410 Line 1 | 4/7/08 | Best Luck Inn | Lodging | -$98.55 |
| 412 Line 2 | 4/10/08 | Jeffrey's Automotive | Automotive Repair | $1,500.00 |
| 414 Line 3 | 4/2/08 | Bank USA PAYMNT CREDIT CRD  0812 3854 634 812 | Transfer | -$1,225.00 |
| 416 Line 4 | 4/2/08 | Bank USA PAYMNT CREDIT CRD  5256 4896 486 431 | Transfer | -$958.00 |
| 418 Line 5 | 3/28/08 | Samson's Supermarket | Supermarket | -$152.80 |
| 420 Line 6 | 3/18/08 | Houston Furniture Store |   | -$599.65 |
| 422 Line 7 | 3/15/08 | Delicious Dessert Diner |   | -$34.65 |
| 424 Line 8 | 3/10/08 | Jeffrey's Automotive | Automotive Repair | $1,500.00 |
| 426 Line 9 | 3/8/08 | Samson's Supermarket | Supermarket | -$8.00 |
| 428 Line 10 | 3/2/08 | Bank USA PAYMNT CREDIT CRD  0812 3854 634 812 | Transfer | -$1,563.56 |
| 430 Line 11 | 3/2/08 | Happy Frog Store |   | -$32.50 |
| 432 Line 12 | 3/1/08 | Bank USA PAYMNT CREDIT CRD  5256 4896 486 431 | Transfer | -$652.08 |
| 434 Line 13 | 2/28/08 | Houston Furniture Store |   | -$35.16 |
| 436 Line 14 | 2/27/08 | Delicious Dessert Diner |   | -$25.31 |
| 438 Line 15 | 2/12/08 | FIT MEM DUE |   | -$53.40 |
| 440 Line 16 | 12/11/08 | The Bistro at Swan Inn |   | -$98.52 |

400 Transaction Listing

FIGURE 7I

|  | 402<br>Date | 404<br>Description | 406<br>Category | 408<br>Amount |
|---|---|---|---|---|
|  | Date | Description | Category | Amount |
| 410 Line 1 | 4/7/08 | Best Luck Inn | Lodging | -$98.55 |
| 412 Line 2 | 4/10/08 | Jeffrey's Automotive | Automotive Repair | $1,500.00 |
| 414 Line 3 | 4/2/08 | Bank USA PAYMNT CREDIT CRD  0812 3854 634 812 | Transfer | -$1,225.00 |
| 416 Line 4 | 4/2/08 | Bank USA PAYMNT CREDIT CRD  5256 4896 486 431 | Transfer | -$958.00 |
| 418 Line 5 | 3/28/08 | Samson's Supermarket | Supermarket | -$152.80 |
| 420 Line 6 | 3/18/08 | Houston Furniture Store | Retail | -$599.65 |
| 422 Line 7 | 3/15/08 | Delicious Dessert Diner |  | -$34.65 |
| 424 Line 8 | 3/10/08 | Jeffrey's Automotive | Automotive Repair | $1,500.00 |
| 426 Line 9 | 3/8/08 | Samson's Supermarket | Supermarket | -$8.00 |
| 428 Line 10 | 3/2/08 | Bank USA PAYMNT CREDIT CRD  0812 3854 634 812 | Transfer | -$1,563.56 |
| 430 Line 11 | 3/2/08 | Happy Frog Store |  | -$32.50 |
| 432 Line 12 | 3/1/08 | Bank USA PAYMNT CREDIT CRD  5256 4896 486 431 | Transfer | -$652.08 |
| 434 Line 13 | 2/28/08 | Houston Furniture Store | Retail | -$35.16 |
| 436 Line 14 | 2/27/08 | Delicious Dessert Diner |  | -$25.31 |
| 438 Line 15 | 2/12/08 | FIT MEM DUE |  | -$53.40 |
| 440 Line 16 | 12/11/08 | The Bistro at Swan Inn |  | -$98.52 |

400 Transaction Listing

FIGURE 7J

|  | 402<br>Date | 404<br>Description | 406<br>Category | 408<br>Amount |
|---|---|---|---|---|
| 410 Line 1 | 4/7/08 | Best Luck Inn | Lodging | -$98.55 |
| 412 Line 2 | 4/10/08 | Jeffrey's Automotive | Automotive Repair | $1,500.00 |
| 414 Line 3 | 4/2/08 | Bank USA PAYMNT CREDIT CRD 0812 3854 634 812 | Transfer | -$1,225.00 |
| 416 Line 4 | 4/2/08 | Bank USA PAYMNT CREDIT CRD 5256 4896 486 431 | Transfer | -$958.00 |
| 418 Line 5 | 3/28/08 | Samson's Supermarket | Supermarket | -$152.80 |
| 420 Line 6 | 3/18/08 | Houston Furniture Store | Retail | -$599.65 |
| 422 Line 7 | 3/15/08 | Delicious Dessert Diner | Restaurant | -$34.65 |
| 424 Line 8 | 3/10/08 | Jeffrey's Automotive | Automotive Repair | $1,500.00 |
| 426 Line 9 | 3/8/08 | Samson's Supermarket | Supermarket | -$8.00 |
| 428 Line 10 | 3/2/08 | Bank USA PAYMNT CREDIT CRD 0812 3854 634 812 | Transfer | -$1,563.56 |
| 430 Line 11 | 3/2/08 | Happy Frog Store |  | -$32.50 |
| 432 Line 12 | 3/1/08 | Bank USA PAYMNT CREDIT CRD 5256 4896 486 431 | Transfer | -$652.08 |
| 434 Line 13 | 2/28/08 | Houston Furniture Store | Retail | -$35.16 |
| 436 Line 14 | 2/27/08 | Delicious Dessert Diner | Restaurant | -$25.31 |
| 438 Line 15 | 2/12/08 | FIT MEM DUE |  | -$53.40 |
| 440 Line 16 | 12/11/08 | The Bistro at Swan Inn |  | -$98.52 |

400 Transaction Listing

FIGURE 7K

|  | 402<br>Date | 404<br>Description | 406<br>Category | 408<br>Amount |
|---|---|---|---|---|
|  | Date | Description | Category | Amount |
| 410 Line 1 | 4/7/08 | Best Luck Inn | Lodging | -$98.55 |
| 412 Line 2 | 4/10/08 | Jeffrey's Automotive | Automotive Repair | $1,500.00 |
| 414 Line 3 | 4/2/08 | Bank USA PAYMNT CREDIT CRD  0812 3854 634 812 | Transfer | -$1,225.00 |
| 416 Line 4 | 4/2/08 | Bank USA PAYMNT CREDIT CRD  5256 4896 486 431 | Transfer | -$958.00 |
| 418 Line 5 | 3/28/08 | Samson's Supermarket | Supermarket | -$152.80 |
| 420 Line 6 | 3/18/08 | Houston Furniture Store | Retail | -$599.65 |
| 422 Line 7 | 3/15/08 | Delicious Dessert Diner | Restaurant | -$34.65 |
| 424 Line 8 | 3/10/08 | Jeffrey's Automotive | Automotive Repair | $1,500.00 |
| 426 Line 9 | 3/8/08 | Samson's Supermarket | Supermarket | -$8.00 |
| 428 Line 10 | 3/2/08 | Bank USA PAYMNT CREDIT CRD  0812 3854 634 812 | Transfer | -$1,563.56 |
| 430 Line 11 | 3/2/08 | Happy Frog Store | Gift Shop | -$32.50 |
| 432 Line 12 | 3/1/08 | Bank USA PAYMNT CREDIT CRD  5256 4896 486 431 | Transfer | -$652.08 |
| 434 Line 13 | 2/28/08 | Houston Furniture Store | Retail | -$35.16 |
| 436 Line 14 | 2/27/08 | Delicious Dessert Diner | Restaurant | -$25.31 |
| 438 Line 15 | 2/12/08 | FIT MEM DUE |  | -$53.40 |
| 440 Line 16 | 12/11/08 | The Bistro at Swan Inn |  | -$98.52 |

400 Transaction Listing

FIGURE 7L

|  | 402<br>Date | 404<br>Description | 406<br>Category | 408<br>Amount |
|---|---|---|---|---|
| | Date | Description | Category | Amount |
| 410 Line 1 | 4/7/08 | Best Luck Inn | Lodging | -$98.55 |
| 412 Line 2 | 4/10/08 | Jeffrey's Automotive | Automotive Repair | $1,500.00 |
| 414 Line 3 | 4/2/08 | Bank USA PAYMNT CREDIT CRD 0812 3854 634 812 | Transfer | -$1,225.00 |
| 416 Line 4 | 4/2/08 | Bank USA PAYMNT CREDIT CRD 5256 4896 486 431 | Transfer | -$958.00 |
| 418 Line 5 | 3/28/08 | Samson's Supermarket | Supermarket | -$152.80 |
| 420 Line 6 | 3/18/08 | Houston Furniture Store | Retail | -$599.65 |
| 422 Line 7 | 3/15/08 | Delicious Dessert Diner | Restaurant | -$34.65 |
| 424 Line 8 | 3/10/08 | Jeffrey's Automotive | Automotive Repair | $1,500.00 |
| 426 Line 9 | 3/8/08 | Samson's Supermarket | Supermarket | -$8.00 |
| 428 Line 10 | 3/2/08 | Bank USA PAYMNT CREDIT CRD 0812 3854 634 812 | Transfer | -$1,563.56 |
| 430 Line 11 | 3/2/08 | Happy Frog Store | Gift Shop | -$32.50 |
| 432 Line 12 | 3/1/08 | Bank USA PAYMNT CREDIT CRD 5256 4896 486 431 | Transfer | -$652.08 |
| 434 Line 13 | 2/28/08 | Houston Furniture Store | Retail | -$35.16 |
| 436 Line 14 | 2/27/08 | Delicious Dessert Diner | Restaurant | -$25.31 |
| 438 Line 15 | 2/12/08 | FIT MEM DUE | Gym Membership | -$53.40 |
| 440 Line 16 | 12/11/08 | The Bistro at Swan Inn | | -$98.52 |

400 Transaction Listing

FIGURE 7M

|  | 402<br>Date | 404<br>Description | 406<br>Category | 408<br>Amount |
|---|---|---|---|---|
|  | Date | Description | Category | Amount |
| 410 Line 1 | 4/7/08 | Best Luck Inn | Lodging | -$98.55 |
| 412 Line 2 | 4/10/08 | Jeffrey's Automotive | Automotive Repair | $1,500.00 |
| 414 Line 3 | 4/2/08 | Bank USA PAYMNT CREDIT CRD  0812 3854 634 812 | Transfer | -$1,225.00 |
| 416 Line 4 | 4/2/08 | Bank USA PAYMNT CREDIT CRD  5256 4896 486 431 | Transfer | -$958.00 |
| 418 Line 5 | 3/28/08 | Samson's Supermarket | Supermarket | -$152.80 |
| 420 Line 6 | 3/18/08 | Houston Furniture Store | Retail | -$599.65 |
| 422 Line 7 | 3/15/08 | Delicious Dessert Diner | Restaurant | -$34.65 |
| 424 Line 8 | 3/10/08 | Jeffrey's Automotive | Automotive Repair | $1,500.00 |
| 426 Line 9 | 3/8/08 | Samson's Supermarket | Supermarket | -$8.00 |
| 428 Line 10 | 3/2/08 | Bank USA PAYMNT CREDIT CRD  0812 3854 634 812 | Transfer | -$1,563.56 |
| 430 Line 11 | 3/2/08 | Happy Frog Store | Gift Shop | -$32.50 |
| 432 Line 12 | 3/1/08 | Bank USA PAYMNT CREDIT CRD  5256 4896 486 431 | Transfer | -$652.08 |
| 434 Line 13 | 2/28/08 | Houston Furniture Store | Retail | -$35.16 |
| 436 Line 14 | 2/27/08 | Delicious Dessert Diner | Restaurant | -$25.31 |
| 438 Line 15 | 2/12/08 | FIT MEM DUE | Gym Membership | -$53.40 |
| 440 Line 16 | 12/11/08 | The Bistro at Swan Inn | Restaurant | -$98.52 |

400 Transaction Listing

FIGURE 7N

|  | 402<br>Date | 404<br>Description | 406<br>Category | 408<br>Amount |
|---|---|---|---|---|
|  | Date | Description | Category | Amount |
| 410 Line 1 | 4/7/08 | Best Luck Inn | Lodging | -$98.55 |
| 412 Line 2 | 4/10/08 | Jeffrey's Automotive | Automotive Repair | $1,500.00 |
| 414 Line 3 | 4/2/08 | Bank USA PAYMNT CREDIT CRD  0812 3854 634 812 | Transfer | -$1,225.00 |
| 416 Line 4 | 4/2/08 | Bank USA PAYMNT CREDIT CRD  5256 4896 486 431 | Transfer | -$958.00 |
| 418 Line 5 | 3/28/08 | Samson's Supermarket | Bakery | -$152.80 |
| 420 Line 6 | 3/18/08 | Houston Furniture Store | Retail | -$599.65 |
| 422 Line 7 | 3/15/08 | Delicious Dessert Diner | Restaurant | -$34.65 |
| 424 Line 8 | 3/10/08 | Jeffrey's Automotive | Automotive Repair | $1,500.00 |
| 426 Line 9 | 3/8/08 | Samson's Supermarket | Bakery | -$8.00 |
| 428 Line 10 | 3/2/08 | Bank USA PAYMNT CREDIT CRD  0812 3854 634 812 | Transfer | -$1,563.56 |
| 430 Line 11 | 3/2/08 | Happy Frog Store | Gift Shop | -$32.50 |
| 432 Line 12 | 3/1/08 | Bank USA PAYMNT CREDIT CRD  5256 4896 486 431 | Transfer | -$652.08 |
| 434 Line 13 | 2/28/08 | Houston Furniture Store | Retail | -$35.16 |
| 436 Line 14 | 2/27/08 | Delicious Dessert Diner | Restaurant | -$25.31 |
| 438 Line 15 | 2/12/08 | FIT MEM DUE | Gym Membership | -$53.40 |
| 440 Line 16 | 12/11/08 | The Bistro at Swan Inn | Restaurant | -$98.52 |

400 Transaction Listing

FIGURE 7P

450 User Categorization Preferences

| | Description | Category | Timestamp |
|---|---|---|---|
| 455 Line 1 | FIT MEM DUE | Gym | 2006-08-09 14-27-01 |
| 456 Line 2 | FIT MEM DUE | Gym Membership | 2007-05-11 07-52-32 |
| 457 Line 3 | Samson's Supermarket | Bakery | 2008-07-24 11-13-40 |

452 Description
453 Category
454 Category

FIGURE 7Q

460 Collaborative Categorization Data

| | Description | Category | Score | Category | Score |
|---|---|---|---|---|---|
| 472 Line 1 | Best Luck Inn | Lodging | 12 | Employer | 5 |
| 474 Line 2 | Jeffrey's Automotive | Automotive Repair | 8 | Automotive Parts Retail | 6 |
| 476 Line 3 | Happy Frog Store | Gift Shop | 2 | | |
| 478 Line 4 | Houston Furniture Store | Retail | 60 | Repair | 35 |
| 480 Line 5 | Samson's Supermarket | Supermarket | 62 | Bakery | 19 |

462 Description
464 Category 1
466 Score 1
468 Category 2
470 Score 2

FIGURE 7R

METHOD AND SYSTEM FOR RECOGNITION AND CATEGORIZATION OF FINANCIAL TRANSACTIONS

CROSS-REFERENCE TO RELATED APPLICATIONS

The present application is a continuation in part of and claims benefit to U.S. patent application Ser. No. 11/833,206, entitled "Method and System for Automatic Recognition and Categorization of Transactions" filed Aug. 2, 2007 by Marko Rukonic and Suresh R. Rao, assigned to the assignee of the present application, and is hereby incorporated by reference.

BACKGROUND

In general, personal finance is related to the application of financial principles to monetary decisions of an individual or family unit. Personal finance typically takes into account financial risks and future events in determining how the individual or family unit obtains, budgets, saves, and spends financial resources. Components of personal finance may include the monitoring and management of various items, such as bank accounts, investment accounts, retirement accounts, credit cards, consumer loans, social security benefits, insurance policies, income tax, etc.

Financial planning is an important aspect of personal finance. Financial planning often includes the steps of assessment, goal setting, planning, execution, and monitoring and reassessment. Assessment involves the evaluation of the financial situation of an individual or a family by creating personal balance sheets and income statements. Personal balance sheets may include a list of personal assets (e.g., home, car, stocks, bonds, or other assets) and values of those assets, as well as a list of personal liabilities (e.g., loans, mortgages, credit card debts, or other liabilities). Income statements may list income and expenses of a person or family.

Goal setting involves creating a list of financial goals, such as setting an age of retirement, a net worth at retirement, a deadline for purchasing a home, a deadline for paying off a loan, etc. Planning then determines the actions that need to be taken to reach the financial goals. Such actions may include reducing unnecessary expenses, increasing employment income, and reallocation of investments. Once made, the plans are executed, sometimes with assistance from accountants, financial advisors, lawyers, and other professionals. In addition, as the plans are carried out, the person's or family's financial progress is monitored and/or reassessed.

Each of the steps above may be performed with the help of accounting and/or financial planning software or professionals using the same or similar software. For example, information (such as income, expenses, liabilities, and assets) about an individual and/or family unit is entered into an accounting program. The program may then query the individual and/or family unit for a set of financial goals, as well as make recommendations regarding choosing financial goals. The program may also generate one or more plans enabling the individual and/or family unit to reach the financial goals. Once a plan is selected, the program may also monitor the progress of the individual and/or family unit in carrying out the plan. The program may further reassess the financial situation, progress, goals, and plan(s) of the individual and/or family unit over time and in light of events that financially impact the individual and/or family unit.

To track the financial progress of the individual and/or family unit, the accounting and/or financial planning software may download the financial information from one or more financial institutions. The financial information may include account types, account balances, and/or any financial transactions associated with the respective accounts. Often the financial transactions are stored in a proprietary format by the financial institution.

SUMMARY

In general, in one aspect, the invention relates to a method for categorizing financial transactions. The method involves identifying a vendor of the first financial transaction, performing a first operation to categorize the financial transaction according to a first categorization level, and identifying the financial transaction as unable to be categorized by the first categorization level after performing the first operation, wherein the first categorization level complies with a first categorization scheme. The method further involves performing a second operation to categorize the first financial transaction according to a second categorization level based on the identification of the financial transaction as unable to be categorized according to the first categorization level, wherein the second categorization level complies with a second categorization scheme. The method further involves identifying the financial transaction as unable to be categorized by the second categorization level after performing the second operation, and categorizing the first financial transaction according to a third categorization level to define the vendor category based on the identification of the financial transaction as unable to be categorized according to the second categorization level, wherein the third categorization level complies with a third categorization scheme. The method further involves displaying the vendor category, and categorizing, with the vendor category, a second financial transaction associated with the same vendor as the first financial transaction. The first categorization scheme differs from the second categorization scheme.

In general, in one aspect, the invention relates to a computer system for categorizing financial transactions. The computer system includes a processor, a memory, and software instructions. The software instructions are stored in memory for causing the computer system to identify a vendor of the first financial transaction, perform a first operation to categorize the financial transaction according to a first categorization level, and identify the financial transaction as unable to be categorized by the first categorization level after performing the first operation, wherein the first categorization level complies with a first categorization scheme. The software instructions further cause the computer system to perform a second operation to categorize the first financial transaction according to a second categorization level based on the identification of the financial transaction as unable to be categorized according to the first categorization level, wherein the second categorization level complies with a second categorization scheme, and identify the financial transaction as unable to be categorized by the second categorization level after performing the second operation. The software instructions further cause the computer system to categorize the first financial transaction according to a third categorization level to define the vendor category based on the identification of the financial transaction as unable to be categorized according to the second categorization level, wherein the third categorization level complies with a third categorization scheme, display the vendor category, and categorize, with the vendor category, a second financial transaction associated with the same vendor as the first financial transaction. The first categorization scheme differs from the second categorization scheme.

In general, in one aspect, the invention relates to a computer readable medium that includes computer readable program code embodied therein. The computer readable program code causes a computer system to identify a vendor of the first financial transaction, perform a first operation to categorize the financial transaction according to a first categorization level, and identify the financial transaction as unable to be categorized by the first categorization level after performing the first operation, wherein the first categorization level complies with a first categorization scheme. The computer readable program code further causes the computer system to perform a second operation to categorize the first financial transaction according to a second categorization level based on the identification of the financial transaction as unable to be categorized according to the first categorization level, wherein the second categorization level complies with a second categorization scheme, and identify the financial transaction as unable to be categorized by the second categorization level after performing the second operation. The computer readable program code further causes the computer system to categorize the first financial transaction according to a third categorization level to define the vendor category based on the identification of the financial transaction as unable to be categorized according to the second categorization level, wherein the third categorization level complies with a third categorization scheme. The computer readable program code further causes the computer system to display the vendor category, and categorize, with the vendor category, a second financial transaction associated with the same vendor as the first financial transaction. The first categorization scheme differs from the second categorization scheme.

Other aspects of the invention will be apparent from the following description and the appended claims.

BRIEF DESCRIPTION OF DRAWINGS

FIGS. 7A-7N and 7P-7R show an example in accordance with one or more embodiments of the invention.

DETAILED DESCRIPTION

Figure 1:
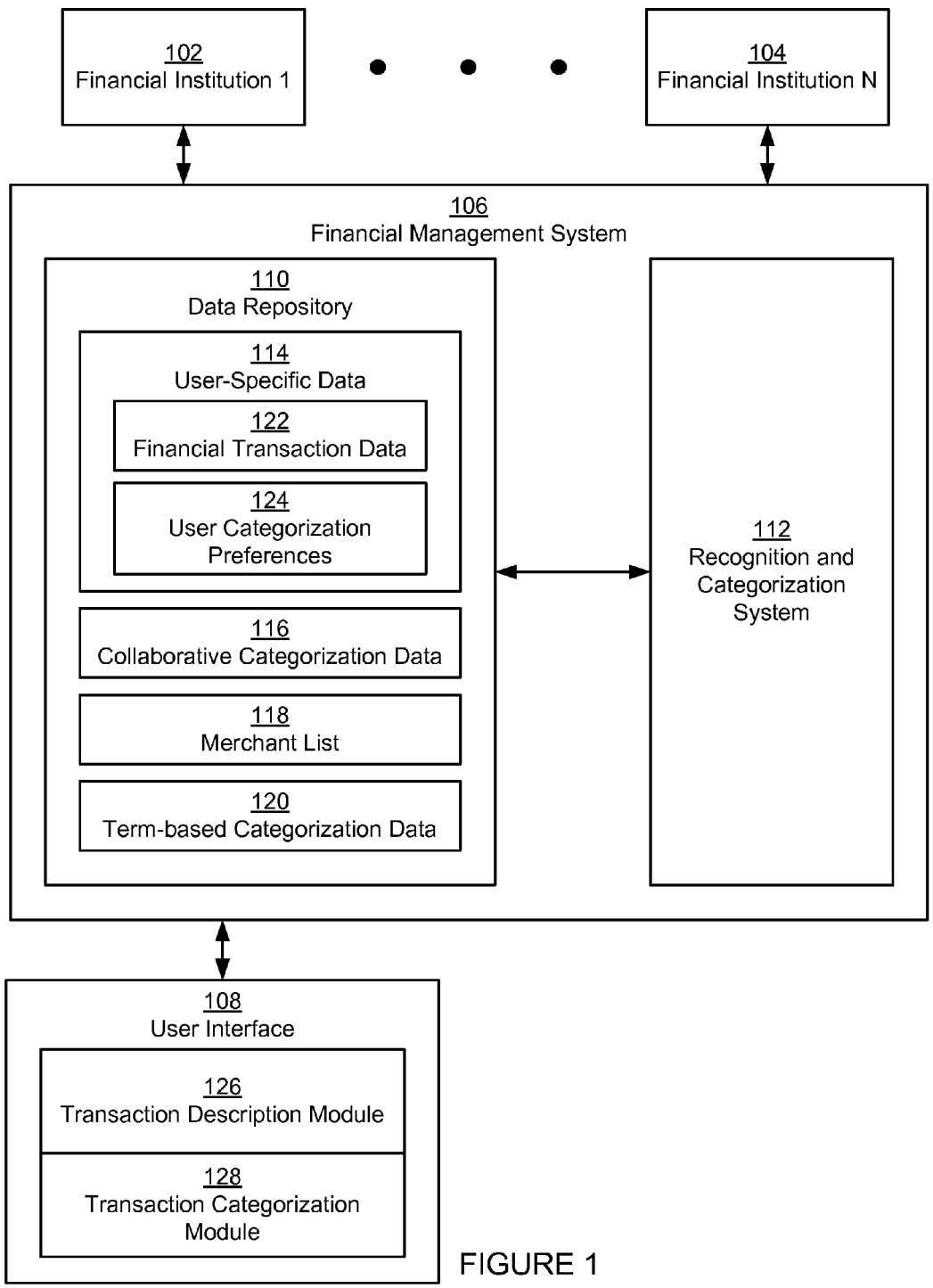
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for automatically categorizing financial transactions. Specifically, embodiments of the invention categorize financial transactions based on an ordered set of categorization levels. Each categorization level defines a scheme to categorize the financial transaction. The scheme defines the data to compare with the financial transaction in order to categorize the financial transaction. If the financial transaction cannot be categorized according to the scheme defined in the first categorization level, then an attempt is made to categorize the financial transaction according to the scheme defined in the second categorization level. Likewise, if the financial transaction cannot be categorized according to the scheme defined in the second categorization level, then an attempt is made to categorize the financial transaction according to the scheme defined in a third categorization level. When the financial transaction is categorized, similar financial transactions may be automatically categorized with the same category as the financial transaction.

A category is a mechanism of grouping multiple similar financial transactions. For example, a category may be travel, gas, employer, employee, tax-deductible, tax exempt, house expense, business expense, as well as any of the other numerous grouping definitions. In one or more embodiments of the invention, a financial transaction may be assigned more than one category. For example, the same financial transaction may be assigned fitness and tax exempt or business expense and gas.

A financial transaction is an exchange of a good or service for a monetary amount. For example, the financial transaction may be to purchase one or more products, pay a debt, or perform other such financial transactions. The product may be one or more goods (e.g., groceries, furniture, plane tickets, hotel reservations) or services (e.g., roofing services, medical services, restaurant services, electricity, or any other service). In one or more embodiments of the invention, the financial transaction is performed with a vendor. The vendor may be any individual or entity that provides the product, is owed the debt, pays the debt, or performs any other such action for performing the financial transaction with a financial account owner or with an individual or entity acting on behalf of the account owner. Accordingly, the monetary amount may be positive or negative depending on whether the account owner is paying the monetary amount or receiving the monetary amount.

FIG. 1 shows a schematic diagram of a system in accordance with one or more embodiments of the invention. As shown in FIG. 1, the system includes financial institutions (e.g., financial institution A (102), financial institution B (104)), a financial management system (106), and a user interface (108), in accordance with one or more embodiments of the invention. Each of these components is discussed below.

Financial institutions (e.g., financial institution A (102), financial institution B (104)) are companies that have financial accounts for account owners to allow the account owner to perform the financial transaction. For example, financial institutions (e.g., financial institution A (102), financial institution B (104)) may include banks, credit card companies, mortgage companies, investment brokerages, and/or other organizations that participate on behalf of the user in the financial transactions. In one or more embodiments of the invention, financial institutions (e.g., financial institution A (102), financial institution B (104)) maintain financial transaction data. Financial transaction data includes records of financial transactions that are performed with the financial account of the account owner at the financial institution. A record includes information about a single specific financial transaction. For example, if an account owner has a credit card with a credit card company, the credit card company may store a record reflecting each financial transaction that is performed with the credit card.

In one or more embodiments of the invention, each record in the financial transaction data may include a date of the financial transaction, a description of the financial transaction and a monetary amount of the financial transaction. The description may include vendor identification, the location of the vendor, an account number, a description of the financial transaction (e.g., membership dues) or other such data. The description may be stored by financial institutions (e.g., financial institution A (102), financial institution B (104)) in a proprietary format. Specifically, description may include extraneous information (e.g., the user's name, collects, and other such words), character limits, lack of white space (e.g., WalterPlaceApts), abbreviations (e.g., "Serv" for service, "mem" for membership, "paymnt" for payment) and/or other qualities that may complicate user recognition of the vendor names. In addition, the financial institutions (e.g., financial institution A (102), financial institution B (104)) may have heterogeneous formatting of the financial transaction data. For example, description one financial institution may have different set of abbreviations for the same stores to use than another financial institution.

In one or more embodiments of the invention, the financial management system (106) is connected to the financial institutions (e.g., financial institution A (102), financial institution B (104)). Specifically, the financial management system (106) includes functionality to obtain financial transaction data from one or more financial institutions (e.g., financial institution A (102), financial institution B (104)). In one or more embodiments of the invention, the financial management system (106) may include an interface with each financial institution to exchange information and/or associated funds so that a user may track and/or manage financial transactions and/or accounts with each financial institution.

The user is any individual or entity that uses the financial management system. For example, the user may be an account owner or a person acting on behalf of the account owner in accordance with one or more embodiments of the invention.

The financial management system (106) provides financial services to users. In one or more embodiments of the invention, the financial management system (106) provides accounting services to users of the financial management system (106). For example, the financial management system (106) may provide personal financial planning services, such as financial assessment, budgeting, account tracking, bill payment, and tax preparation services, to users of the financial management system (106). In one or more embodiments of the invention, certain users of the financial management system (106), such as accountants and tax attorneys, may provide accounting services to other users of the financial management system (106) using the financial management system (106).

In one or more embodiments of the invention, the financial management system (106) is implemented using client-server architecture. The financial management system (106) itself may be an enterprise application running on one or more servers, and in some embodiments could be a peer-to-peer system, or resident upon a single computing system. For example, the financial management system (106) may be accessible via the Internet. Alternatively, the financial management system (106) may be a software product that executes completely or partially on a user's personal computer or other computing device of the user.

In one or more embodiments of the invention, the financial management system (106) includes functionality to categorize financial transactions. Specifically, the financial management system includes functionality to provide a category to each financial transaction. As shown in FIG. 1, the financial management system (106) may include several components including a data repository (110) and a recognition and categorization system (112). The financial management system may include additional components not shown in FIG. 1.

In one or more embodiments of the invention, the data repository (110) is any type of storage unit and/or device (e.g., a file system, database, collection of tables, or any other storage mechanism) for storing data. Further, the data repository (110) may include multiple different storage units and/or devices. For example, one portion of the data (e.g., financial transaction data (122)) may be stored on one server or set of servers in the data repository (110) while another portion of the data (e.g., user categorization preferences (124), collaborative categorization data, a merchant list (118), and term-based categorization data (120) (discussed below)) may be stored on another server or set of servers in the data repository (110). The multiple different storage units and/or devices may or may not be of the same type or located at the same physical site. For example, a portion of the data repository (110) may be on a local server while another portion is distributed across the Internet. For example, one portion of the data repository may be on a user's personal computer while another portion is located on a central server. In one or more embodiments of the invention, the data repository (110), or a portion thereof, is secure.

In one or more embodiments of the invention, the data in the data repository includes categorization data. Categorization data is data for categorizing financial transactions. Additional data may be included, such as account management data, data for interfacing with financial institutions or users, configuration data, and other such data without departing from the scope of the invention. In one or more embodiments of the invention, the categorization data include store user categorization preferences (124), collaborative categorization data, a merchant list (118), and term-based categorization data (120). Each of the different types of categorization data defines a different scheme for categorizing financial transactions in accordance with one or more embodiments of the invention.

User-specific data (114) is data that is specific to a particular user or account owner. The user-specific data (114) includes financial transaction data (122) and the user categorization preferences (124). The financial transaction data (122) includes the financial transaction data obtained from financial institutions. The financial transaction data may be temporarily or permanently stored in the data repository. For example, the financial transaction data (122) may synchronize with the financial transaction data (not shown) managed by the financial institutions. Alternatively, once the user completes using the financial transaction data (122), the financial transaction data (122) may be deleted from the data repository (110).

User categorization preferences (124) are categories that are assigned by the user to particular vendors. Specifically, the user categorization preferences (124) are category transaction pairs previously assigned by the user. For example, the user categorization preferences (124) may be defined when a user approves of a category for a particular financial transaction, submits (e.g., by typing in the name or selecting the name) of the category for a particular financial transaction, assigns a category to a vendor without reference to a particular financial transaction, or performs other such actions. The user categorization preferences (124) maintains a list of the assignments by the user. The user categorization preference level defines a scheme whereby transactions are categorized according to the user categorization preferences (124).

Further, in one or more embodiments of the invention, the user may select and/or provide a different category for the same vendor when the user access subsequent financial transactions having the same vendor. Each user categorization preference for the vendor category pair may stored in the user-specific data (114). If a vendor is assigned multiple different categories in different financial transactions, the user categorization preference for a particular vendor may be ordered according to the number of times that a user has selected the category or based on the last time that the user has selected the category.

Continuing with the data repository, collaborative categorization data (116) includes categorization preferences from multiple users. Specifically, collaborative categorization data defines a scheme whereby categorization preferences from multiple users are used to determine the category for a particular vendor. More specifically, as each user defines categorization preferences (124) for the user, the categorization preferences (124) of multiple users may be used to create the collaborative categorization data (116). The collaborative categorization level defines a scheme whereby transactions are categorized using the collaborative categorization data (116).

In one or more embodiments of the invention, the collaborative categorization data (116) associates a vendor and category pair with a score. The same vendor may be associated with different categories in the collaborative categorization data. The score may be used to order the categories. In one or more embodiments of the invention, the score is based on the number of unique users who assign the category to the vendor. Namely, the same user cannot contribute more than once to the score of the vendor/category pair. In one or more embodiments of the invention, the same user may not be able to contribute more than once for a vendor. Specifically, when a user re-categorizes a vendor, the re-categorization is not updated in the collaborative categorization data. Alternatively, when the user re-categorizes a vendor, the score for the old category may be decremented while the score for the new category is incremented.

For example, "Rick's Shoe Store" may be associated with both the category "employer" and the category "shoes." The "Rick Shoe Store", "employer" pair may be associated with a score of six because six different employees of Rick's Shoe Store are users of the financial management system (106) and have assigned the category "employer" to the store. The "Rick Shoe Store", "shoes" pair may be associated with a score of fifty because fifty different customers of Rick's Shoe Store are users of the financial management system (106) and have assigned the category "shoes" to the store.

In one or more embodiments of the invention, the score is used to create a ranked list of vendor and category pairs. The collaborative categorization data (116) may change as more users categorize financial transactions. For example, in one or more embodiments of the invention, a vendor may have two unique categories in the collaborative categorization data (116). The first category and vendor pair may have a score of fifteen and the second category and vendor pair may have a score of ten. However, the next six users may select the second category and vendor pair as their categorization preferences for the vendor, thus increasing the score for the second category vendor pair. As a result, the second category and vendor pair has a score of sixteen and switches with the first category and vendor pair in the ranked list.

In one or more embodiments of the invention, the merchant list (118) is a general listing of merchants and categories. Specifically, the merchant list (118) is a list of vendors who are recognized as merchants. In one or more embodiments of the invention, the merchant list (118) is defined by a company and does not include user input. The merchant list (118) may be periodically updated to include new merchants and remove merchants that are not used or are no longer in business. Merchant names in the merchant list (118) are the proper names for the merchant. For example, the merchant names may include the full name (i.e., without abbreviation), and white spaces where appropriate, while not including extraneous information, such as exact store locations and user accounts. The merchant list level defines a scheme whereby transactions are categorized using the merchant list (118).

In one or more embodiments of the invention, the term-based categorization data associates general terms or words that may appear in a vendor's name with a category. For example, the term "fitness" may be associated with "sport" category, "sport's equipment" category and other such categories. In another example, "diner" may be associated with the category "restaurant." A term in the term-based categorization data may also be a grouping of one or more words. For example, the term based categorization data (120) may include "movie rental", "movie", and "rental". When multiple words are grouped, the grouping may be ordered or unordered. The term-based categorization level defines a scheme whereby general terms in the term based categorization data (120) that may be in a vendor's name are used to identify the category. For example, in the term-based categorization scheme, a vendor called "Mom's Diner" may be assigned the category "restaurant" because the word "diner" is in the vendor's name and "diner" is assigned the category of "restaurant."

Continuing with the financial management system (106), a recognition and categorization system (112) is associated with the data repository (110). The recognition and categorization system (112) includes functionality to assign categories to financial transactions. In one or more embodiments of the invention, assigning categories to the financial transactions includes normalizing the vendor's name in the description of the financial transaction. Normalizing the vendor's name may include removing extraneous alphanumeric characters, adding or removing abbreviations, or performing other such actions.

In one or more embodiments of the invention, a user interface (108) is connected to the financial management system (106). The user interface (108) allows the user to interact with various components of the financial management system (106) using a user-friendly environment (e.g., a graphical user interface). Further, because of the sensitive nature of financial information, the user interface (108) may employ various known techniques for keeping sensitive information secure. In one or more embodiments of the invention, the user interface (108) includes one or more web pages that can be reached from a computer system with a web browser and/or internet connection. Alternatively, the user interface (108) may be an application that resides on a computing system. The computer system may be a personal computer, a mobile phone, a personal digital assistant, and other computing device of the user.

In one or more embodiments of the invention, in addition to other possible components, the user interface (108) includes a transaction description module (126) and a transaction categorization module (128). The transaction description module (126) includes functionality to display records of one or more financial transactions. The transaction categorization module (128) includes functionality to display at least one category for each of the records defined in the transaction description module. In one or more embodiments of the invention, the transaction categorization module (128) may further include functionality to receive a submission of a category from a user.

FIGS. 2-6 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. In addition, steps such as store acknowledgements have been omitted to simplify the presentation.

Figure 2:
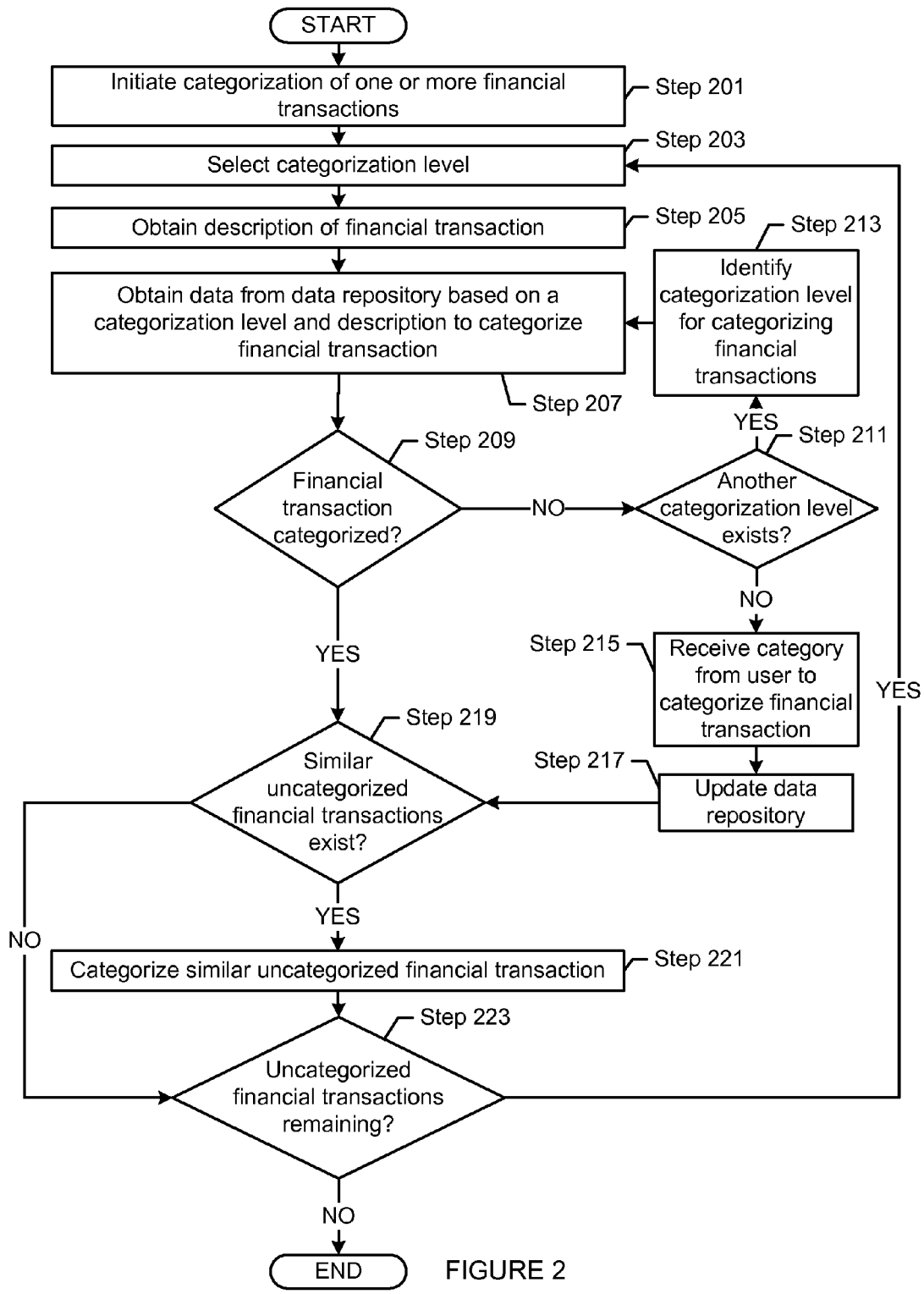
FIGS. 2-6 show flowcharts in accordance with one or more embodiments of the invention.

FIG. 2 shows a flowchart for categorizing financial transactions in accordance with one or more embodiments of the invention. FIG. 2 shows a flowchart for categorizing one or more financial transactions according to different categorization levels. Initially, the categorization of one or more financial transactions is initiated (Step 201). For example, the initiation of the financial transactions may be based on adding financial transaction data to the user-specific data in the data repository, a user command to categorize the financial transaction, the user accessing the financial management system, or based on any other such trigger.

In Step 203, a categorization level is selected. In one or more embodiments of the invention, each categorization level is associated with a scheme for categorizing the transaction. In one or more embodiments of the invention, the first categorization level is the user categorization preference level. The second categorization level may be associated with the collaborative categorization level. The third categorization level may be associated with the merchant list level. The fourth categorization level may be associated with the term-based categorization level. The above ordering of categorization levels are as an example only. The ordering may be different without departing from the scope of the invention. In one or more embodiments of the invention, the levels are selected in the order of the first categorization level, the second categorization level, the third categorization level, and the fourth categorization level.

In one or more embodiments of the invention, the description of the financial transaction is obtained (Step 205). Based on the description and the categorization level, data is obtained from the data repository to categorize the financial transaction (Step 207). Specifically, an attempt is made to categorize the financial transaction according to the level. The categorization level defines which portion of the data repository to access. The portion of the data repository is queried to determine whether a category exists that matches the description or a portion thereof.

For example, in the user preferences categorization level, the user categorization preferences are accessed to determine whether the vendor of the financial transaction is associated with a financial transaction. The accessing of the user categorization preferences may be based on the vendor's name or the entire description in the financial transaction data. Categorizing the financial transaction using the user preferences categorization level is discussed below in relation to FIG. 3. Categorizing the financial transaction using the collaborative categorization level is discussed below and in FIG. 4. Categorizing the financial transaction using the merchant list level is discussed below and in FIGS. 5A-5F. Categorizing the financial transaction using the term-based categorization level is discussed below and in FIG. 6.

Returning to FIG. 2, in Step 209, a determination is made whether the financial transaction is categorized. If the financial transaction is not categorized, then a determination is made whether another categorization level exists (Step 211). Another categorization level exists when an attempt has not been made to categorize the financial transaction according to one of the categorization levels.

If another categorization level exists, then the categorization level is identified for categorizing the financial transaction (Step 213). Accordingly, the method may repeat with attempting to categorize the financial transaction according to the next categorization level.

Alternatively, if another categorization level does not exist, then a category may be received from the user to categorize the financial transaction (Step 215). Specifically, the user may be prompted for a category. The prompt may indicate that a category is not found for the financial transaction. Alternatively, after an attempt is made to categorize all financial transactions in the financial transaction data, the user may realize that the remaining financial transactions are not assigned categories in the data repository. Accordingly, the user may manually enter the category name.

In Step 217, the data repository is updated. Specifically, the user categorization preferences may be updated to reflect the assignment of the vendor to the category. Further, the collaborative categorization data may be updated to reflect the assignment of the vendor to the category by the user. On the first assignment, the vendor and category pair may be given a score of one.

In Step 219, a determination is made whether similar uncategorized financial transactions exist. Specifically, a determination is made whether the financial transaction data includes additional records of financial transactions having the same or similar descriptions. For example, the entire description may be the same or just the vendor name may be the same. In Step 221, if a similar uncategorized financial transaction exists, then the similar uncategorized financial transactions are categorized with the same category as assigned in Step 207 or 217.

In Step 223, a determination is made whether any uncategorized financial transactions are remaining. If any uncategorized financial transactions remain, then the method may repeat to categorize the remaining financial transactions at the next categorization level.

Figure 3:
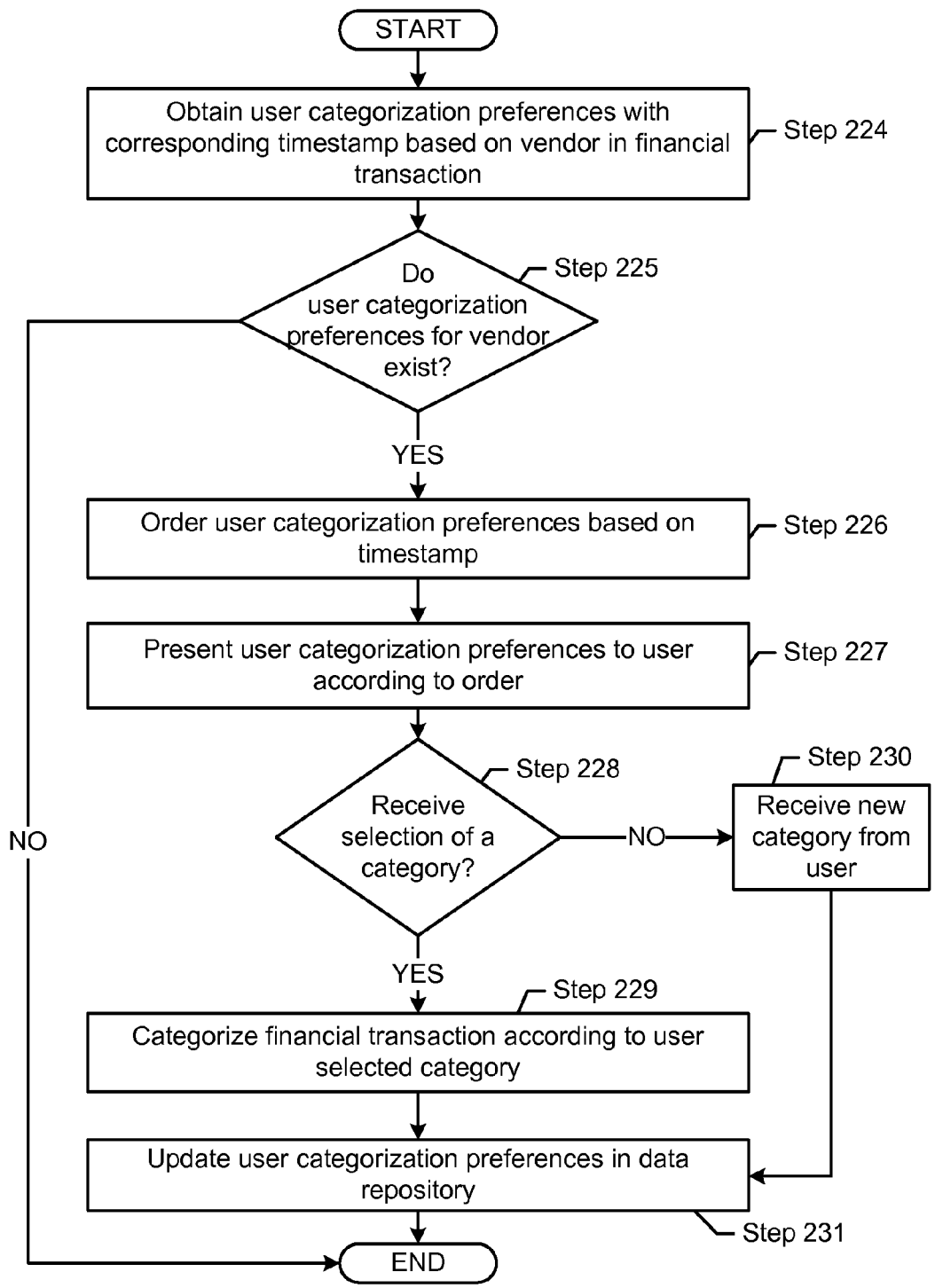

FIG. 3 shows a flowchart for categorizing the financial transaction according to the user preference categorization level in accordance with one or more embodiments of the invention. In Step 224, in accordance with one or more embodiments of the invention, user categorization preferences are obtained with a corresponding timestamp based on the vendor in the financial transaction. The corresponding timestamp defines when the user last categorized the transaction according to the category corresponding to the timestamp. In order to obtain the user categorization preferences, the description in the financial transaction may be normalized to identify the vendor. Normalizing the description may be performed in such a manner as discussed below in FIG. 5A. Using the vendor name, the user categorization preferences may be queried with the vendor name.

In Step 225, a determination is made whether at least one user categorization preference exists for the vendor in accordance with one or more embodiments of the invention. Specifically, a determination is made whether a vendor name of the user categorization preferences match the vendor name of the financial transaction. The match may be an exact match or an approximate match in accordance with one or more embodiments of the invention. If a match does not exist, then the determination may be made that the financial transaction cannot be categorized using the collaborative category level. Accordingly, if a match does not exist, the method may return to FIG. 2.

If a match does exist, then the user categorization preferences are ordered based on the timestamp (Step 226) in accordance with one or more embodiments of the invention. Thus, the user may be presented with the categories in the user categorization preferences according to the order (Step 227) in accordance with one or more embodiments of the invention. The user may be presented with the categories in a list. Each category in the list may be presented with or without the corresponding timestamp. The list may be displayed in a window, in a tab, as a pop-up box, or in any other user interface device. Although not shown in FIG. 3, the category with the most recent timestamp may be automatically assigned to the financial transaction without requiring user input in accordance with one or more embodiments of the invention. In one or more embodiments of the invention, the user may change the assignment after the category is assigned.

In Step 228, a determination is made whether a selection of a category is received in accordance with one or more embodiments of the invention. The user may approve of a category by selecting the category from the list of categories. If the user selects a category, then the financial transaction is categorized according to the user selected category (Step 229) in accordance with one or more embodiments of the invention. Specifically, the category the user selected may be assigned to the financial transaction.

Alternatively, in accordance with one or more embodiments of the invention, if the user does not select a category, then a new category is received from the user (Step 243). The financial transaction may then be categorized according to the new category.

Regardless of whether the user selects the category, when a category is received that is approved by the user either by selection or by submitting a new category, the user categorization preferences and timestamp are updated in the data repository (Step 231) in accordance with one or more embodiments of the invention.

Figure 4:
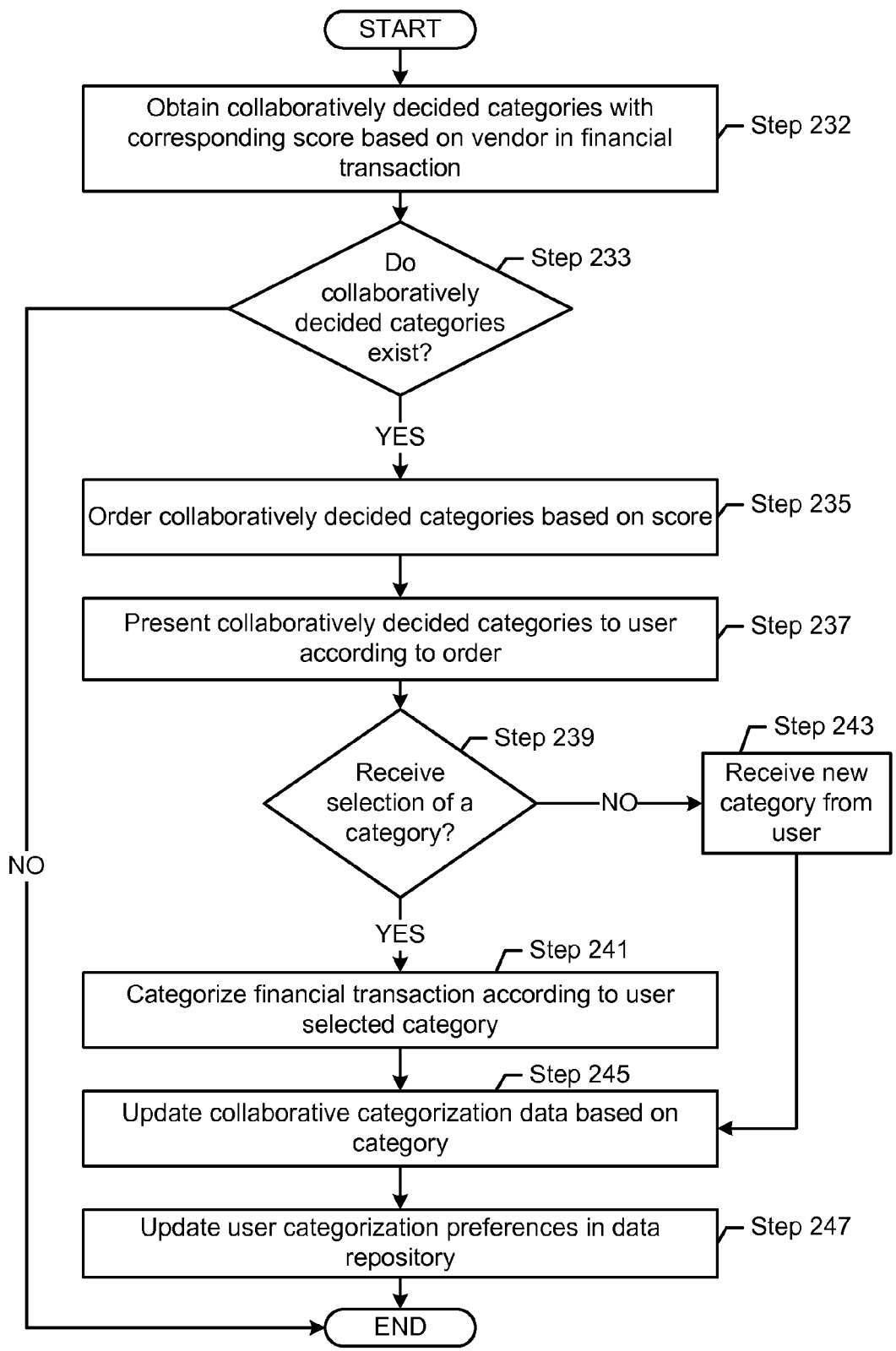

FIG. 4 shows a flowchart for categorizing the financial transaction according to the collaborative categorization level in accordance with one or more embodiments of the invention. In Step 232, collaboratively decided categories are obtained with the corresponding score based on the vendor in the financial transaction in accordance with one or more embodiments of the invention. In order to obtain the collaboratively decided categories, the description in the financial transaction may be normalized to identify the vendor. Normalizing the description may be performed as discussed below in FIG. 5A. Using the vendor name, the collaborative categorization data may be queried with the vendor name.

In Step 233, a determination is made whether at least one collaboratively decided category exists for the vendor in accordance with one or more embodiments of the invention. Specifically, a determination is made whether a vendor name of the collaboratively decided categories match the vendor name of the financial transaction. The match may be an exact match or an approximate match in accordance with one or more embodiments of the invention. If a match does not exist, then the determination may be made that the financial transaction cannot be categorized using the collaborative category level. Accordingly, the method may return to FIG. 2.

If a match does exist, then the collaboratively decided categories are ordered based on the score (Step 235) in accordance with one or more embodiments of the invention. Thus, the user may be presented with the collaboratively decided categories according to the score (Step 237). The user may be presented with the categories in a list. Each category in the list may be presented with the score. The list may be displayed in a window, in a tab, as a pop-up box, or in any other user interface device. Since the user is presented with the collaboratively decided categories according to the score, the user may identify the categories that other users assigned to the type of the financial transaction. Although not shown in FIG. 4, the category with the highest score may be automatically assigned to the financial transaction without requiring user input. The user may change the assignment after the category is assigned.

In Step 239, a determination is made whether a selection of a category is received in accordance with one or more embodiments of the invention. The user may approve of a category by selecting the category from the list of categories. If the user selects a category, then the financial transaction is categorized according to the user selected category (Step 241) in accordance with one or more embodiments of the invention. Specifically, the category the user selected may be assigned to the financial transaction.

Alternatively, in accordance with one or more embodiments of the invention, if the user does not select a category, then a new category is received from the user (Step 243). The financial transaction may then be categorized according to the new category.

Regardless of whether the user selects the category, when a category is received that is approved by the user either by selection or by submitting a new category, the collaborative categorization data is updated based on the category in accordance with one or more embodiments of the invention (Step 245). Specifically, if a new category is received, then the new category is associated with the vendor name in the collaborative categorization data. Further, the score is updated to reflect the addition of the user as approving of the assignment of the category to the vendor.

In Step 247, the user categorization preferences are updated in the data repository in accordance with one or more embodiments of the invention. Because the user categorization preferences are updated, future financial transactions with the same vendor may be assigned with the user categorization preferences. Thus, user input is not required for categorizing the future financial transactions in accordance with one or more embodiments of the invention.

FIGS. 5A-5F show flowcharts for categorizing the financial transaction using the merchant list level in accordance with one or more embodiments of the invention. In Step 261, the vendor name is normalized in accordance with one or more embodiments of the invention. Specifically, the description is normalized to identify the proper name of the vendor. In one or more embodiments of the invention, normalizing the vendor name includes adding white spaces to divide individual words of the vendor name, replacing abbreviations with words, and removing extraneous information. Adding white space may be performed by identifying capital letters in the middle of a collection of characters and adding a white space before the capital letter. Abbreviations may be replaced with words by comparing abbreviations in the vendor name with a list that maps common abbreviations with words. Further, the name of the account owner and long strings of numeric characters may be removed from the description. Other operations may be performed to normalize the vendor name without departing from the scope of the invention.

Figure 5A:
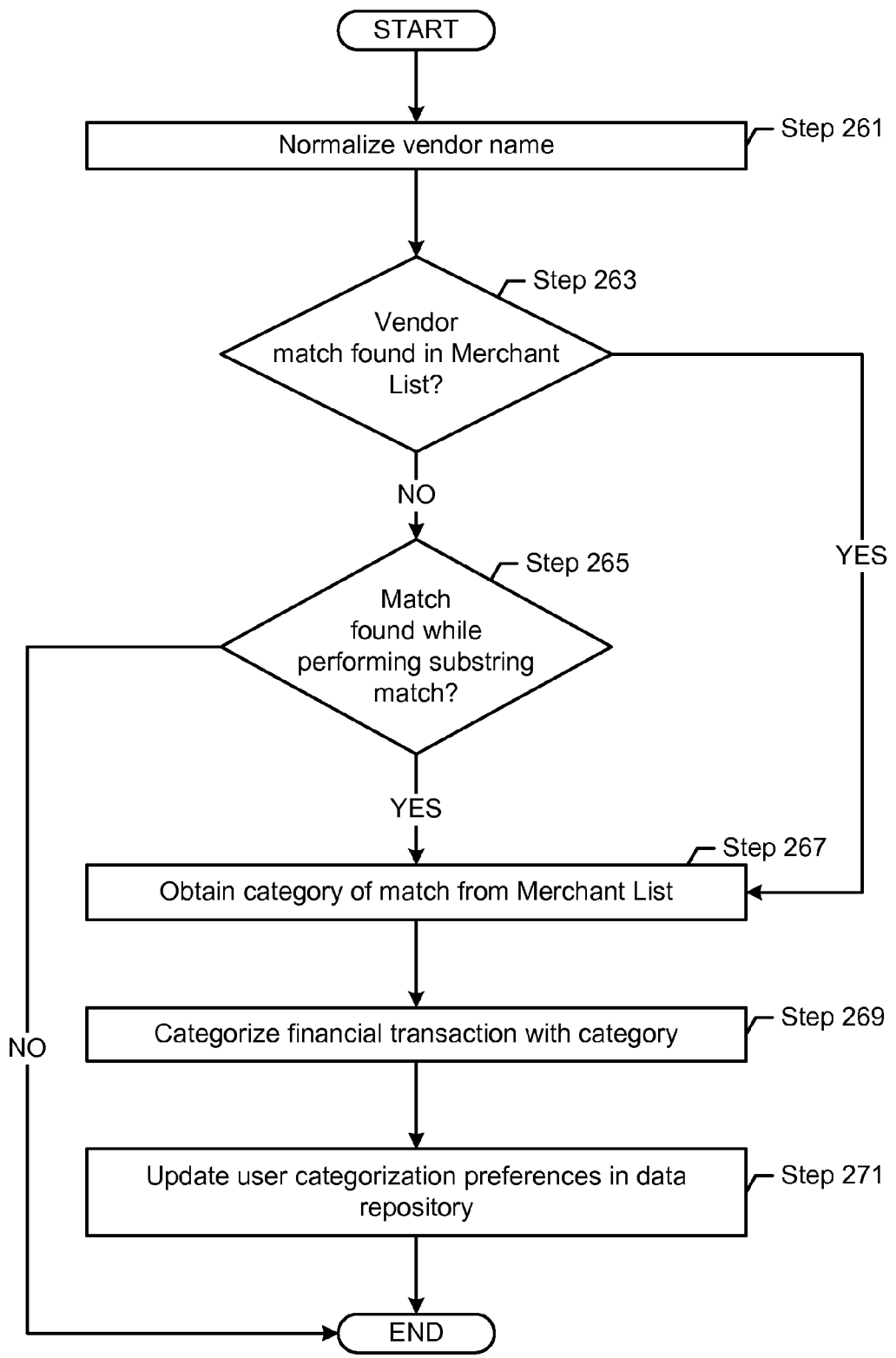

The normalized vendor name is compared with the merchant list to determine whether a match is found (Step 263) in accordance with one or more embodiments of the invention. At this stage, a determination is made whether the vendor name directly matches a name in the merchant list. If a match is not found, then a substring match is performed. The substring match compares portions of the vendor name with portions of the merchant name to determine whether the vendor name partially matches a merchant name. Performing a substring match is discussed below and in FIG. 5B. As shown in FIG. 5A, in accordance with one or more embodiments of the invention, a determination is made whether a match is found while performing a substring match (Step 265).

If a match is found while performing a substring match, then the category of the match is obtained from the merchant list (Step 267) in accordance with one or more embodiments of the invention. Specifically, the category assigned to the matched merchant name may be obtained from the merchant list. In Step 269, the financial transaction is categorized with the category in accordance with one or more embodiments of the invention.

In one or more embodiments of the invention, the user categorization preferences in the data repository are updated (Step 271). The user categorization preferences may be updated to reflect that the description and/or the normalized vendor name should be assigned the category. Thus, future financial transactions with the same description or normalized vendor name may be assigned the same category as the current financial transaction. In alternative embodiments of the invention, the user categorization preferences are not updated until the user approves of the assignment.

Figure 5B:
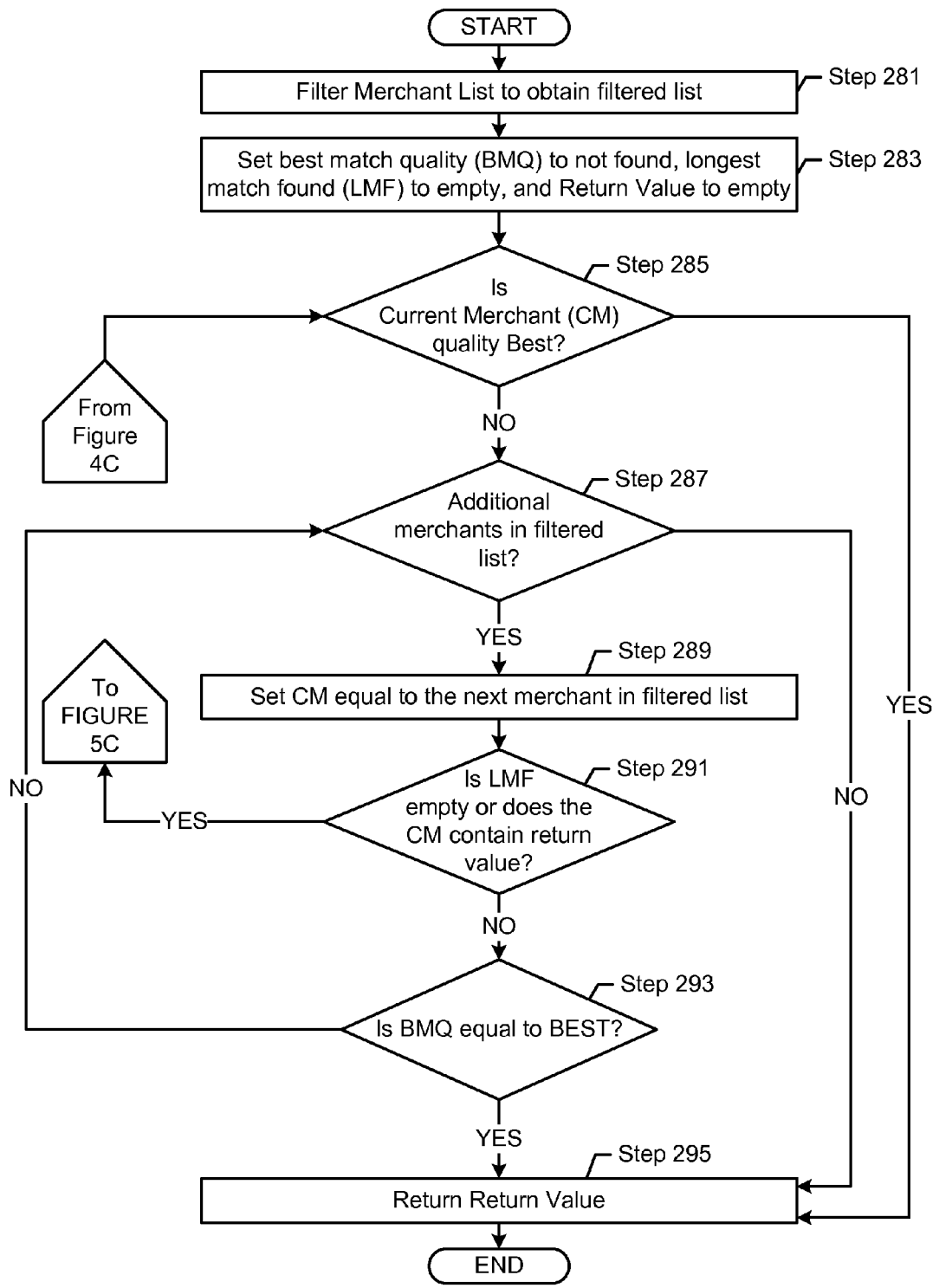

FIG. 5B shows a flowchart for performing a substring match in accordance with one or more embodiments of the invention. FIG. 5B shows a flowchart of a method for performing Step 265 in FIG. 5A in accordance with one or more embodiments of the invention. Using the merchant list, the substring match identifies the merchant in the merchant list that best matches the vendor name. In order to identify the merchant, substring match iterates through the merchants in the merchant list to identify the longest match that best matches the vendor name. Other methods may be used for performing the substring match without departing from the scope of the invention.

In Step 281, the merchant list is filtered to obtain a filtered merchant list in accordance with one or more embodiments of the invention. Filtering the merchant list removes merchant names from the merchant list that are dissimilar to the words in the vendor name. Filtering the merchant list may be performed to decrease the time required for performing the substring match. Accordingly, filtering the merchant list may be optional. FIG. 5F shows a flowchart for filtering the merchant list in accordance with one or more embodiments of the invention.

Continuing with FIG. 5B, in Step 283, the best match quality is set to not found, the longest match found is set to empty, and the return value is set to empty. As discussed above, the substring match iterates through the merchant list to identify the best match for the financial transaction. The best match so far is the merchant at any iteration that so far as of the iteration has been found to match the vendor of the financial transaction. The best match quality is a variable representing the quality of the best match found so far. The longest match is a variable representing the length of the best match found so far. The return value is the name of the best match found so far. At the end of the substring match, the return value is the name of the merchant that is used to categorize the financial transaction. For the purposes of the description below, current merchant is the name of the merchant in the filtered being compared. Initially, the current merchant is set to empty.

In Step 285, a determination is made whether the match quality of the current merchant is best. Specifically, a determination is made whether the match of the current merchant's match quality is best in accordance with one or more embodiments of the invention. The current merchant's match quality is a variable defining how well the current merchant matches the vendor. Setting the current merchant's match quality variable is discussed below in FIG. 5C. When the current merchant's match quality is best, then the current merchant is set as the return value, and the return value is returned as merchant to categorize the financial transaction (Step 295). As discussed above, initially, the current merchant is empty. Accordingly the current merchant's match is not best initially.

Continuing with FIG. 5B, a determination is made whether additional merchants exist in the merchant list (Step 287). If the merchant list is filtered, then the determination is whether additional merchants exist in the filtered list. The determination determines whether the filtered list contains additional merchants that have not been compared with the vendor name.

If the determination is made that additional merchants do not exist in the filtered list, then all merchants have been analyzed. Therefore, the return value is returned (Step 295) in accordance with one or more embodiments of the invention. If the return value is returned empty, then the substring match results in no match found.

Alternatively, in accordance with one or more embodiments of the invention, if a merchant exists in the filtered list, then the current merchant is set equal to the next merchant in the filtered list (Step 289). In Step 291, a determination is made whether the longest match found is empty or whether the current merchant contains the return value in accordance with one or more embodiments of the invention. Thus, a determination is made whether the length of the best match found so far is still empty or whether the current merchant contains the best match found so far.

If the determination is made that the longest match found is not empty and the current merchant does not contain the return value, then a determination is made whether the best match quality is equal to best (Step 293). As discussed above, when the best match quality is equal to best, then the best match found so far (i.e., the return value) has a quality of matching the vendor name as best. In such a scenario, the return value is returned (Step 295). Alternatively, if the best match found is not equal to best, then the method may iterate to the next merchant in the list if another merchant exists (Step 287).

Figure 5C:
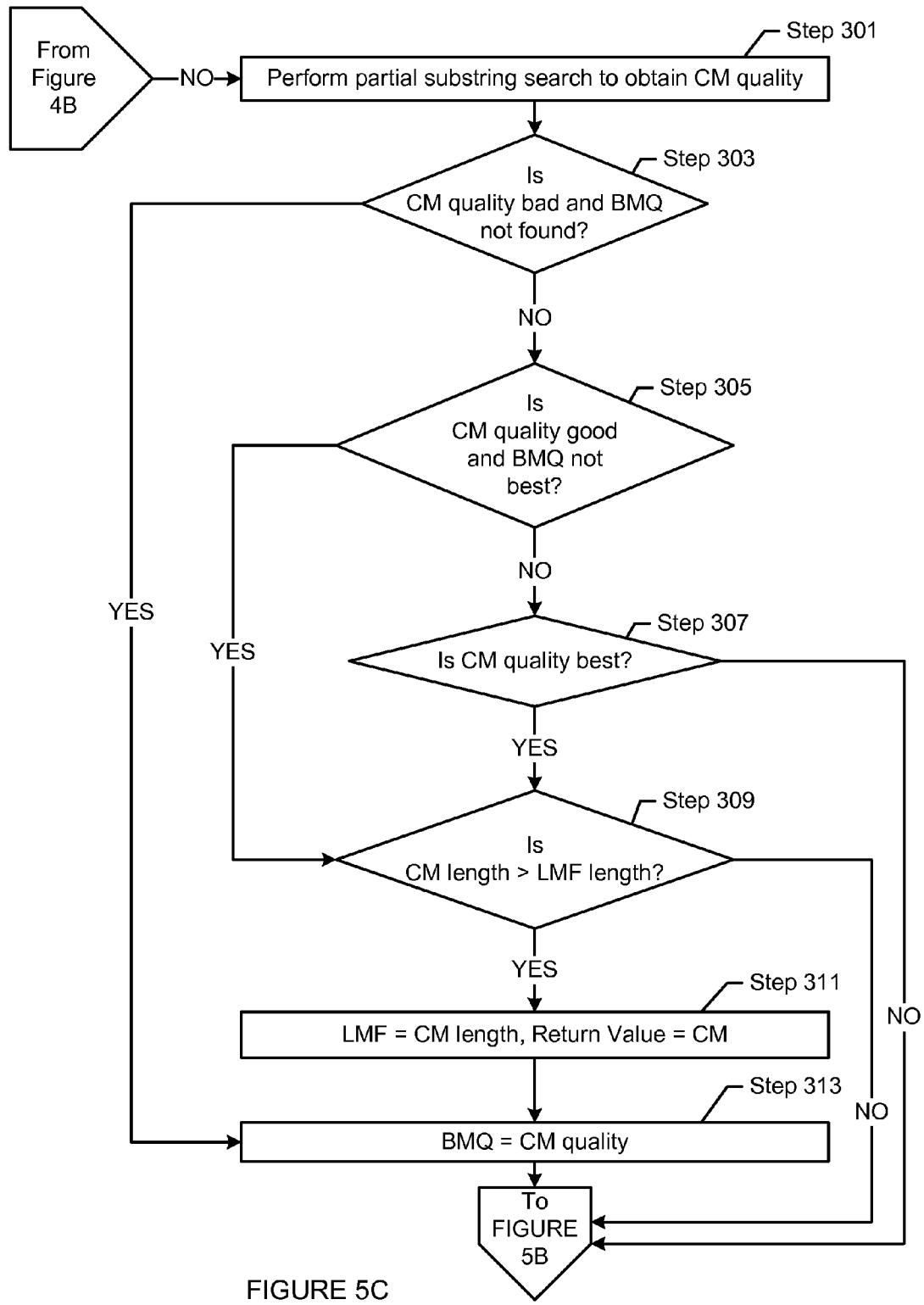

Returning to Step 291, if a determination is made that the longest match found is empty or the current merchant contains the return value, then the flowchart proceeds to FIG. 5C to identify the match quality of the current merchant and to set the variables of longest match found, best match quality, and return value based on the match quality of the current merchant.

As shown in FIG. 5C, a partial substring search is performed to obtain the current merchant quality (Step 301). The result of the partial substring search is a value for the current merchant quality. Performing the partial substring search is discussed below and in FIG. 5D.

Continuing with FIG. 5C, a determination is made whether the current merchant quality is bad and the best match quality is not found (Step 303). If the best match quality is not found, then the quality of the current merchant is the quality of the best match found so far. In such a scenario and when the current merchant quality is bad, then the best match quality is set to the current merchant quality (Step 313). In one or more embodiments of the invention, the longest match found and the return value is not set to reflect the current merchant when the current merchant quality is bad.

Alternatively, if the current merchant quality is not bad or of the best match quality is found, than a determination is made whether the current merchant quality is good and the best match quality is not best (Step 305). If the result of the determination is no, then the current merchant quality may be best and/or the best match quality may be best or bad. In such a scenario, a determination is made whether the current merchant quality is best (Step 307). If the current merchant quality is not best, then the best match quality is better than the quality of the current merchant. In particular, the best match found so far is better than the current merchant. Thus, the longest match found, the return value, and the best match quality are not updated. Rather the method returns to FIG. 5B in accordance with one or more embodiments of the invention.

Alternatively, if the current merchant quality is good and the best match quality is not best or the current merchant quality is best, then a determination is made whether the length of the current merchant is greater than the longest match found (Step 309). If the length of the current merchant is not greater than the longest match found, the method may return to FIG. 5B without updating the longest match found, the return value, and the best match quality.

If the current merchant length is greater than the longest match found, then the current merchant is the best match found so far. Accordingly, the longest match found is set to the current merchant length and the return value is set to the current merchant in Step 311. Further, the best match quality is set to the quality of the current merchant in Step 313. The method may return to FIG. 4B to continue analyzing the merchants in the merchant list.

Figure 5D:
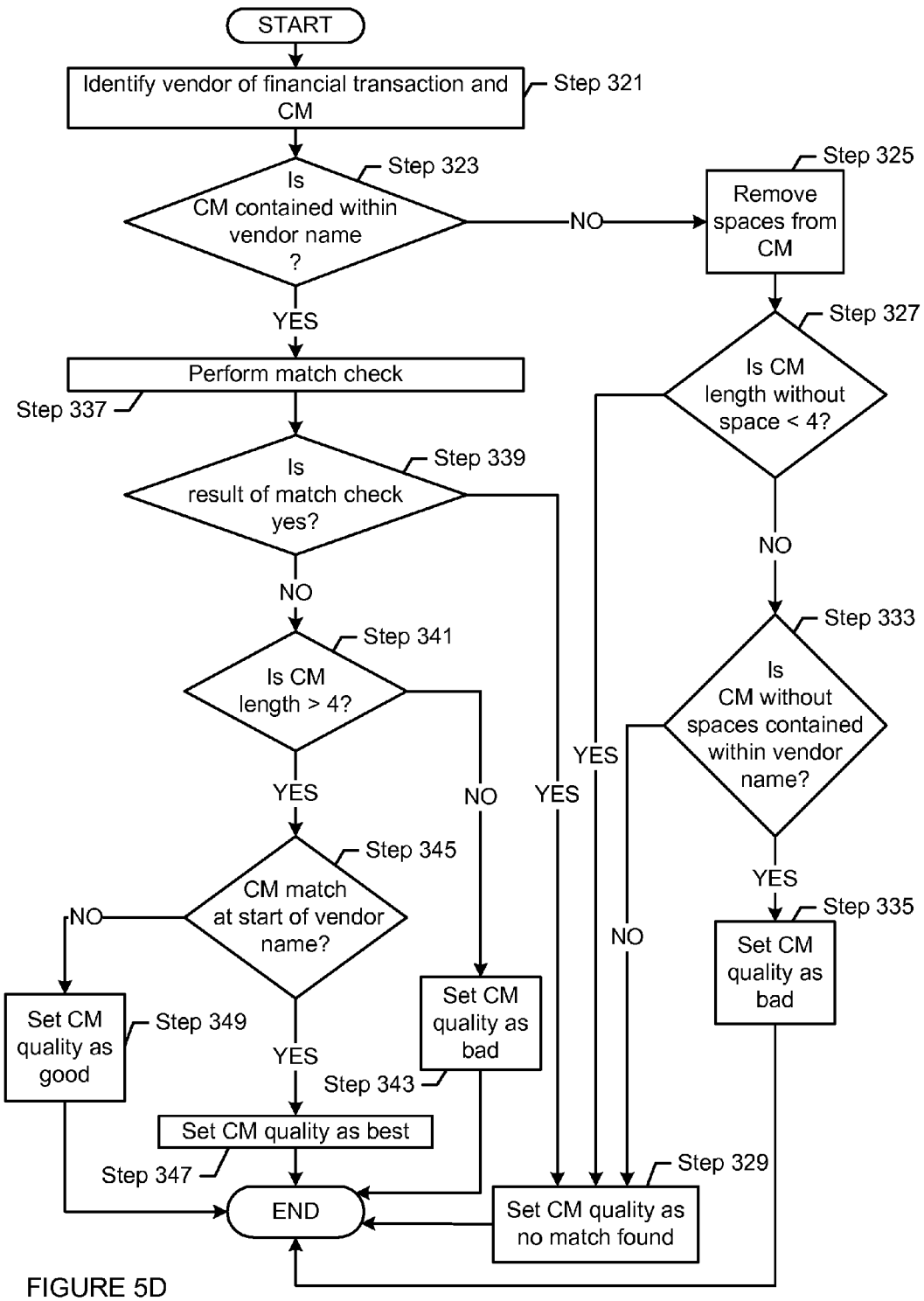

FIG. 5D shows a flowchart for performing a partial substring search in accordance with one or more embodiments of the invention. Although FIG. 5D shows one method for performing the substring match, alternative methods may be used without departing from the scope of the invention. In one or more embodiments of the invention, the results of performing the substring match is the quality of the current merchant.

In Step 321, the vendor of the financial transaction and the current merchant is identified. In Step 323, the vendor is compared with the current merchant to determine whether the current merchant is contained within the vendor name. In particular, a determination is made whether the vendor name contains the current merchant. In one or more embodiments of the invention, the vendor name that is compared is a normalized vendor name. For example, if the current merchant is "Goods Steakhouse" and the vendor name is "Bubba's Goods Steakhouse", the vendor name contains the current merchant. Alternatively, if the current merchant is "Goodie Zoo" and the vendor name is "Muskox Zoo", then the vendor name does not contain the current merchant in accordance with one or more embodiments of the invention.

If the vendor name is not contained in the merchant name of the current merchant, than spaces are removed from the current merchant (Step 325). Specifically, all whitespace within the current merchant is removed. For example, "Goods Steakhouse" becomes "GoodsSteakhouse" after the spaces are removed. A determination is made whether the length of the current merchant without whitespace is less than four in accordance with one or more embodiments of the invention (Step 327). The determination may be whether the length of the current merchant is less than a different number without departing from the scope of the invention.

If the length of the current merchant is less than four, then the current merchant quality is set to no match found (Step 329). If the length of the current merchant is greater than or equal to four, then a determination is made whether the current merchant name without spaces is contained within the vendor name (Step 333). If the current merchant name without spaces is contained within the vendor name, then the current merchant quality is set to bad (Step 335). If the current merchant name without spaces is not contained within the vendor name, then the current merchant quality is set to no match found (Step 329).

Returning to Step 325, if the determination is made that the vendor name is contained within the current merchant name, then a match check is performed (Step 337). In one or more embodiments of the invention, the result of the match check is a yes or no answer. Performing the match check is discussed below and in relation to FIG. 5E.

Figure 5E:
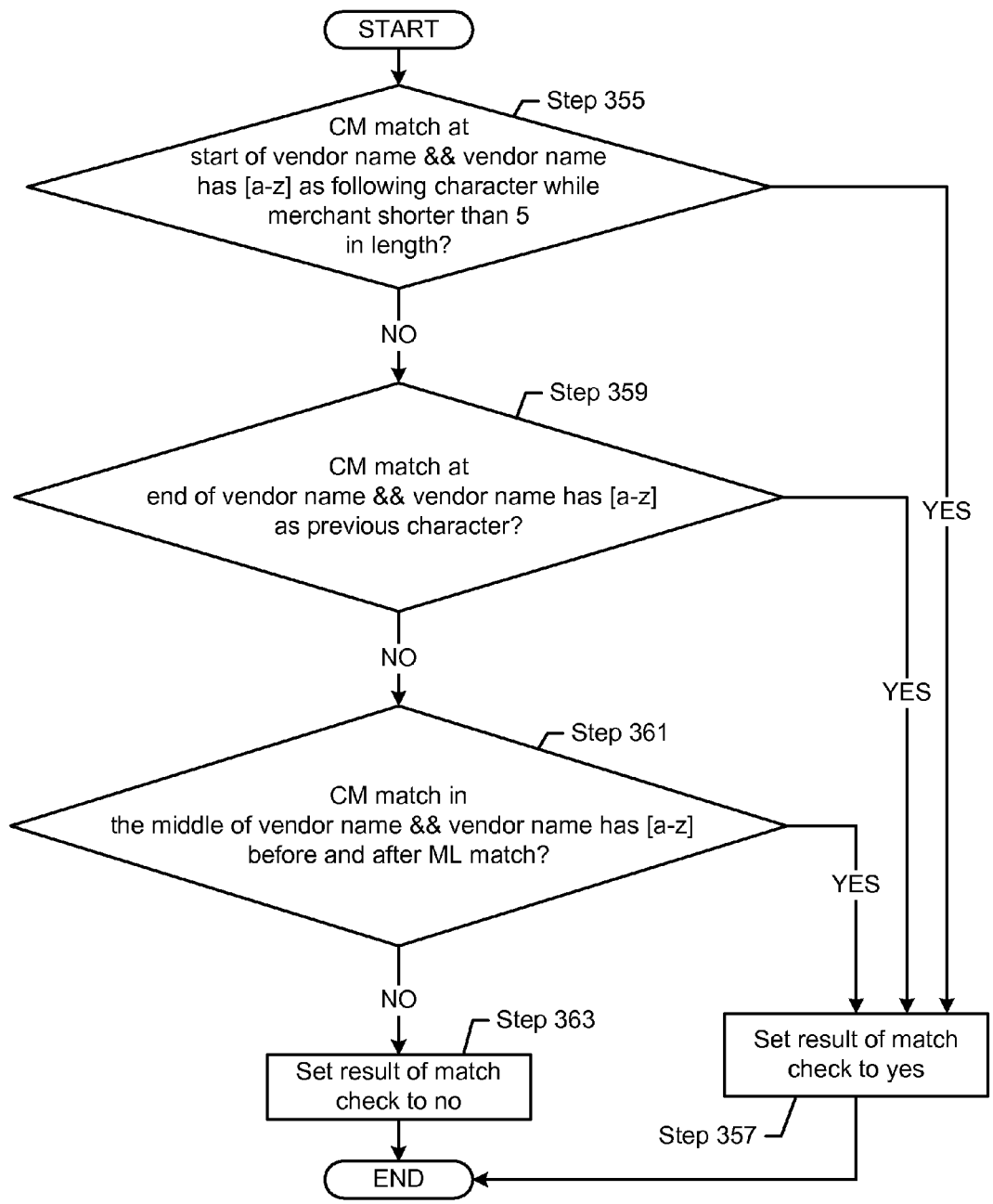
Figure 5F:
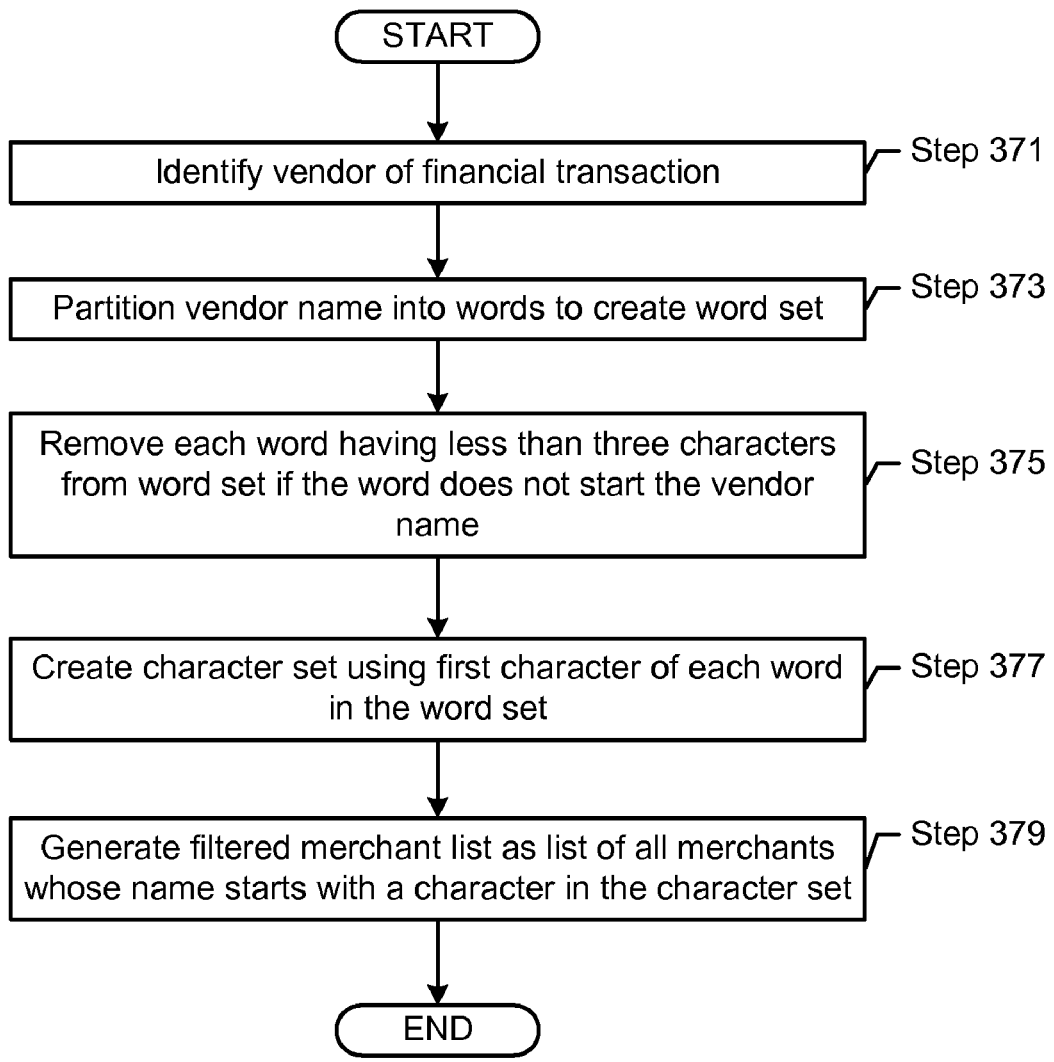

FIG. 5E shows a flowchart for performing a match check in accordance with one or more embodiments of the invention. The match check performs various checks to determine whether the quality of the current match should be no match found. If any of the determinations in FIG. 5E results in a no, then the quality of the current match is no match found as discussed below.

In Step 355, a determination is made whether all of the following conditions exist: current merchant matches at start of vendor name; the vendor has an alphabetic character following the substring matched by the current merchant, and the length of the current merchant is less than five. If all of the above conditions exist, then the result of the match check is set to yes (Step 357). Step 355 may be used, for example, to ensure that vendor "account fees" is not matched to merchant name "ACC" or that vendor "Applebug" not matched to merchant "Apple" in accordance with one or more embodiments of the invention.

In Step 359, a determination is made whether the current merchant is in the substring at the end of the vendor name and whether the previous character before the substring match is alphabetic. If both of the conditions of Step 359 exist, then the result of the match check is set to yes (Step 357). Step 359 may be used, for example, to ensure that vendor "Seashell" is not matched to merchant name "Shell" in accordance with one or more embodiments of the invention.

In Step 361, a determination is made whether all of the following conditions exist: The current merchant matches in the middle of vendor name; and the vendor name has an alphabetic character before and after substring matched. If both of the conditions of Step 361 exist, then the result of the match check is set to yes (Step 357). Step 361 may be used, for example, to ensure that vendor "Chubby's Cafe" is not matched to merchant name "Hubb" in accordance with one or more embodiments of the invention.

If all of the determinations of FIG. 5E are no, then the result of the match check is set to no (Step 363).

Returning to FIG. 5D, a determination is made whether the result of the match check is yes (Step 339). If the result of the match check is yes, then the quality of the current merchant is set to no match found (Step 329).

Alternatively, if the result of the match check is not yes (i.e., no), a determination is made whether the current merchant length is greater than four (Step 341). If the length of the current merchant is not greater than four, then the quality of the current merchant is set to bad (Step 343). The use of the size four may be based on an assumption that when the current merchant length is less than or equal to four, most likely the current merchant is not the vendor in the financial transaction. Different numbers may be used without departing from the scope of the invention.

In Step 345, a determination may be made whether the current merchant matches at the start of the vendor name. The determination may be based on the assumption that when the current merchant name starts at the starting position of the vendor name, then the merchant is most likely the vendor of the financial transaction. Accordingly, if the substring position is equal to zero, then the current merchant quality is set to best (Step 347). If the substring position is not equal to zero, then the current merchant quality is set to good (Step 349). As discussed above, the current merchant quality may be used to determine whether the current merchant is the vendor of the financial transaction. Other steps may be performed using a different set of assumptions without departing from the scope of the invention.

The following are a few examples for performing the substring match in accordance with one or more embodiments of the invention. The following are for example purposes only and not intended to limit the scope of the invention. Specifically, different results for the following examples may occur depending on the embodiment of the invention used. For the following example, consider the scenario in which the merchant list includes the following merchants: "ACC", "Hubb", "Setter's Point", "Seven Eleven", "Severed Tooth Inn", and "Shell".

In the first example, the vendor name is "ABCDEFG". The result of the substring match is NO MATCH for every merchant. Specifically, every current merchant will result in "no" in Step 323 of FIG. 5D. Further, in Step 327, "ACC" would be "yes", thereby resulting in NO MATCH. The remaining merchants will be "no" in Step 333 of FIG. 5D, thereby resulting in NO MATCH.

In a second Example, the vendor name is "Account Fees". The result of the substring match is NO MATCH for every merchant. Step 323 of FIG. 5D is YES for "ACC". However, "ACC" in Step 355 of FIG. 5E results in a "yes". Therefore, for "ACC", the result is NO MATCH. The remaining merchants will follow the same path as in the first example.

In a third example, the vendor name is "ShellXYZ". The result of the substring match is BEST MATCH for "Shell". Specifically, Step 323 in FIG. 5D results in a "yes", the result of the match check in Step 339 is "no", the length of the word "Shell" is greater than four (Step 341), and the match starts at the beginning of the vendor name (Step 345). The remaining merchants will follow the same path as in the first example.

In a fourth example, the payee name is "Hubb's Café". The result of the substring match is BAD MATCH for "Hubb". Specifically, Step 323 in FIG. 5D results in a "yes", however, the result of the match check is "no" (Step 339). Specifically, Step 355 of FIG. 5D results in a "no" in accordance with one or more embodiment of the invention. Therefore, the result of the match check is set to BAD MATCH. The remaining merchants will follow the same path as in the first example.

In a fifth example, the vendor name is "Purchase: Severed Tooth Inn CARD #1441". The result of the substring match is GOOD MATCH for "Severed Tooth Inn" Specifically, Step 323 in FIG. 5D results in a "yes", the result of the match check in Step 339 is "no", and the length of the word "Severed Tooth Inn" is greater than four (Step 341). However, the match does not start at the beginning of the vendor name (Step 345). Thus, the result of the substring match is GOOD MATCH. The remaining merchants will follow the same path as in the first example.

In a sixth example, the vendor name is "seveneleven hhjs". The result of the substring match is BAD MATCH for "Seven Eleven". Specifically, the Step 323 results in a "no" for all merchants. However, after removing all spaces from "Seven Eleven", the result of Step 327 is "no" and the result of Step 333 is "yes". Therefore, the substring match returns BAD MATCH for "Seven Eleven". The remaining merchants will follow the same path as in the first example.

FIG. 5F shows a flowchart for filtering the merchant list in accordance with one or more embodiments of the invention. In Step 371, the vendor of the financial transaction is identified in accordance with one or more embodiments of the invention. In one or more embodiments of the invention, the vendor that is identified is the normalized vendor name.

In Step 373, the vendor name is partitioned into words in accordance with one or more embodiments of the invention. In particular, white spaces may be used to partition the vendor name. A word is any arrangement of alphanumeric characters. The words may or may not be recognized grammatical words. For example, "CC Fine Diner on Main" may be partitioned into "CC", "Fine", "Diner", "on", "Main".

In Step 375, words in the name having less than three characters are removed if the word does not start with the vendor name in accordance with one or more embodiments of the invention. In the above example, "on" may be removed while "CC" is not removed because "CC" starts the vendor's name.

A character set is created using the first character of each word in the word set (Step 377). Using the character set, a filtered merchant list is generated as a list of all merchants in the merchant set whose name starts with a character in the character set. In the above example, the filtered merchant list may contain all merchants whose name starts with "C", "F", "D", or "M". Although FIG. 5F shows one method for filtering the merchant list, other methods may be used without departing from the scope of the invention.

If the financial transaction cannot be categorized using the merchant list, then, as discussed above in FIG. 2, a different categorization level may be used. In one or more embodiments of the invention, the next categorization level that may be used is a term based categorization level. In alternative embodiments of the invention, the ordering of categorization levels may be different without departing from the scope of the invention.

Figure 6:
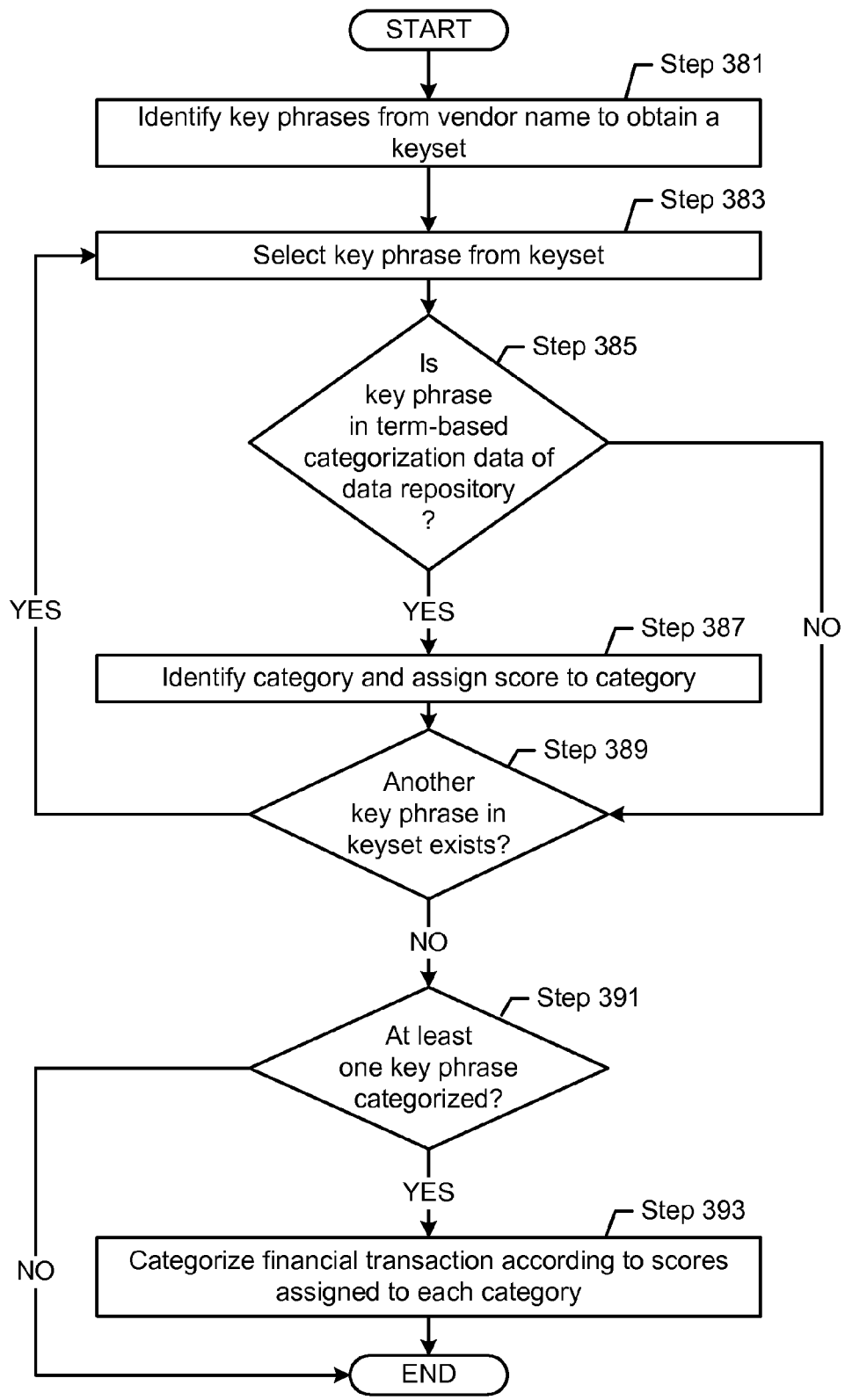

FIG. 6 shows a flowchart for categorizing the financial transaction using the term-based categorization level in accordance with one or more embodiments of the invention. The term based categorization level uses terms in the financial transaction to assign categories to the financial transaction. In Step 381, key phrases from the vendor name are identified to obtain a key set in accordance with one or more embodiments of the invention. Key phrases are groupings of one or more words in the vendor name. A word as used herein is a collection of alphanumeric characters without whitespaces that may or may not be recognizable in a language. In one or more embodiments of the invention, the key set may include overlapping key phrases. For example, if the vendor name is "Bubba's BBQ and Enchiladas", than the key phrases in the key set may include "Bubbas's", "Bubba's BBQ", "BBQ and Enchiladas", "Enchiladas", etc.

In Step 383, a key phrase is selected from the key set in accordance with one or more embodiments of the invention. The selected key phrase is used to query the term-based categorization data in the data repository. A determination is made whether the key phrase is in the term-based categorization data in the data repository (Step 385). If the key phrase is in the term-based categorization data in the data repository, then the category associated with the key phrase is identified and a score is assigned to the category (Step 387) in accordance with one or more embodiments of the invention. In one or more embodiments of the invention, different techniques may be used to assign the score.

The score may be based on the number of key phrases that are in the term-based categorization data and in the keyset and are assigned a specific category. For example, if "BBQ" and "Enchiladas" are in the key set, and are both associated with the category "Food" in the term-based categorization data, then the score for "food" may be set to two.

Alternatively, the score may be based on the number of characters in the key phrase that matches the category. In the "BBQ" and "Enchiladas" example, based on the number of characters, the score may be thirteen because "BBQ" has three characters and "Enchiladas" has ten characters.

Alternatively, the score may be based on the category itself. For example, categories may be associated with scores based on the percentages of times that the category is associated with a financial transaction. In the example, the category "food" may be given a higher score than the category "Jewelry", because a person is more likely to purchase food than jewelry.

The above is only a few examples of the different techniques that may be used to assign a score. Other techniques may be used without departing from the scope of the invention.

In one or more embodiments of the invention, multiple categories may be obtained for the same key phrase. The multiple categories may be hierarchically related. For example, restaurant may be a sub-category of food and a sub-category of entertainment. In one or more embodiments of the invention, each of the multiple different categories may be assigned a score in Step 387. The score may be the same for each of the multiple different categories or based on the specificity of the category. For example, since restaurant is more specific than food, restaurant may be assigned a higher score than food.

Continuing with FIG. 6, in Step 389, a determination is made whether another key phrase exists in the keyset in accordance with one or more embodiments of the invention. If another key phrase exists in the keyset, then the method may repeat with the next key phrase in the keyset (Step 383).

If another key phrase does not exist, then a determination is made whether at least one key phrase from the keyset existed in the term based categorization data (Step 391). Specifically, a determination is made whether at least one category is identified using the term based categorization data. If a category is not identified, then the financial transaction is unable to be categorized using the term-based categorization data.

Alternatively, if at least one category is identified, then the financial transaction is categorized according to the score assigned to each category (Step 293) in accordance with one or more embodiments of the invention. Specifically, the category that is assigned is the category that has the highest score in accordance with one or more embodiments of the invention.

FIGS. 7A-7N and 7P-7R show an example in accordance with one or more embodiments of the invention. The following example is for explanatory purposes only and not intended to limit the scope of the invention. For the following example, consider the scenario in which the financial management system obtains the users financial transactions data performed with the user's account at a financial institution. Before presenting the financial transactions to the user, the financial management application categorizes each of the financial transactions for the user.

FIG. 7A shows an example initial transaction listing (400) in accordance with one or more embodiments of the invention. As shown in FIG. 7A, the transaction listing (400) in the example shows records, denoted by lines (410-440), for sixteen financial transactions. Each record includes financial transaction data. Specifically, each record includes a date (402), a description (404), a category (406), and an amount (408). Since each financial transaction is initially uncategorized, the category (406) for each record is empty. Also, as shown in FIG. 7A, the description (404) of some of the financial transactions (e.g., financial transactions represented in line 3 (414), line 4 (416), line 10 (428), line 12 (432), and line 15 (438)) include abbreviations and have extraneous characters.

Continuing with the example, FIGS. 7B-7D shows categorization data for categorizing each of the financial transactions in accordance with one or more embodiments of the invention. Specifically, FIG. 7B shows a chart of user categorization preferences in accordance with one or more embodiments of the invention. In the example, the user categorization preferences (450) associate a description (452) with a category (453). Further, a timestamp is associated with the description and category pair. In one or more embodiments of the invention, the user explicitly or implicitly agreed to the assigning of categories for the description. For example, the user may have assigned previous financial transactions having the description with the category, or the user may have not changed the category after the assignment was performed for one or more previous financial transactions. As shown in line 1 (455), the user categorization preferences used the category "Gym" for the description of "FIT MEM DUE" at 2:27:01 in the afternoon of Aug. 9, 2006. As shown in line 2 (456), the user categorization preferences used the category "Gym Membership" for the description of "FIT MEM DUE" at 7:52:32 in the morning of May 11, 2007.

FIG. 7C shows example collaborative categorization data (460) for categorizing financial transactions in accordance with one or more embodiments of the invention. The collaborative categorization data (460) associates a description (462) with one or more categories (e.g., category 1 (464), category 2 (468)). Each category and description pair is assigned a score. For example, categories listed in category 1 (464) are assigned a corresponding score listed in score 1 (466). Categories listed in category 2 (468) are assigned a corresponding score listed in score 2 (470). The score (e.g., score 1 (466), score 2 (468)) is based on the number of users that implicitly or explicitly agreed to the assignment of the category (e.g., category 1 (464), category 2 (470)) to the description (462). Although FIG. 7C shows categories in separate columns, multiple categories may exist for the same description. When there are multiple categories and the collaborative categorization data is stored, each description category pair may be in a separate row in accordance with one or more embodiments of the invention.

In the example, the category "Lodging" has a score of twelve for "Best Luck Inn" while the category of "employer" has a score of five as shown in line 1 (472). Twelve users may have stayed at "Best Luck Inn" and therefore assigned "Best Luck Inn" the category of lodging. "Best Luck Inn" may have five employees who assign the category of "employer" to the "Best Luck Inn" to financial transactions corresponding to their paycheck.

Also shown in FIG. 7C, the category "Automotive Repair" has a score of eight for "Jeffrey's Automotive" while the category of "Automotive Parts Retail" has a score of six as shown in line 2 (474). Therefore, more users may consider Jeffrey's Automotive to be a repair shop than a parts store. As shown in line 3 (476), two users have assigned the category "Gift Shop" to "Happy Frog Store."

The category "Retail" has a score of sixty for "Houston's Furniture Store" while the category of "Repair" has a score of thirty-five as shown in line 4 (478). The category "Supermarket" has a score of sixty-two for "Samson's Supermarket" while the category of "Bakery" has a score of eighteen as shown in line 5 (480). The differences of the categorization of Samson's Supermarket may be based on the number of users that go to Samson's Supermarket to buy groceries as opposed to the number of user that go to Samson's Supermarket to buy baked goods.

FIG. 7D shows categorization data for categorizing financial transactions using the merchant list. Specifically, FIG. 7D shows an example, merchant list in accordance with one or more embodiments of the invention. As shown in the example FIG. 7D, the merchant list associates a merchant name (484) with a category (486). In the example, the merchant list is a general list that is defined by a company rather than users in accordance with one or more embodiments of the invention. Specifically, as shown in line 1 (488), "Best Luck Inn" is associated with the "Travel" category. As shown in line 2 (488), "My Shoe Depot" is associated with the "Retail" category. As shown in line 3 (489), "Bank USA" is associated with the "Transfer" category.

FIG. 7E shows example term-based categorization data (490) in accordance with one or more embodiments of the invention. As shown in FIG. 7E, the term-based categorization data (490) associates general terms (492) that may appear in a vendor's name with categories (494). In the example, "diner" is associated with the category "restaurant" in line 1 (495), "inn" is associated with the category "lodging" in line 2 (496), and "bistro" is associated with the category "restaurant" in line 3 (497).

FIGS. 7F-7N show iterations of categorizing each record in the transaction listing (400) by the financial management system. In FIG. 7F, the first financial transaction is identified. The first financial transaction (i.e., line 1 (410)) has the description "Best Luck Inn" Initially, "Best Luck Inn" is compared with the user categorization preferences (450) shown in FIG. 7B. Since "Best Luck Inn" is not in the user categorization preferences, "Best Luck Inn" are compared with the collaborative categorization data (460) shown in FIG. 7C. "Best Luck Inn" is in line 1 (472) of the collaborative categorization data (460) and is associated with the categories "Lodging" and "Employer". Since "Lodging" has a higher score, it is more likely that the user will approve of the "Lodging" category. Therefore, as shown in the example FIG. 7F, "Best Luck Inn" is assigned the category "Lodging" in line 1 (410) of the transaction listing (400). Since financial transactions similar to "Best Luck Inn" do not exist in the transaction listing (400), the financial management system proceeds to the next financial transaction in the example.

Also, as shown in the Example, since "Best Luck Inn" can be categorized with the collaborative categorization data (460) in FIG. 7C, "Best Luck Inn" is not categorized with the Merchant list (482) in FIG. 7D. In the example, multiple users may be better able to define which category should be applied to a vendor rather than a company that defines the merchant list. In alternative embodiments of the invention, however, category associations defined in the Merchant List may take greater precedence over category associations defined by the collaborative categorization data.

Continuing with the example, the next financial transaction is "Jeffrey's Automotive". Similar to "Best Luck Inn", "Jeffrey's Automotive" is not in the user categorization preferences (450) in FIG. 7B. Thus, "Jeffrey's Automotive" is compared with the collaborative categorization data (460) shown in FIG. 7C. "Jeffrey's Automotive" is in line 2 (474) of the collaborative categorization data (460) and is associated with the categories "Automotive Repair" and "Automotive Retail". As with "Best Luck Inn", since "Automotive Repair" has a higher score, "Jeffrey's Automotive" is assigned the category "Automotive Repair" in line 2 (412), as shown the example FIG. 7G. Since the description "Jeffrey's Automotive" is also in line 8 (424), "Jeffrey's Automotive" in line 8 (424) is also assigned the category "Automotive Repair" as shown in FIG. 7G.

The next financial transaction (i.e., line 3 (414) has the description "Bank USA PAYMNT CREDIT CRD 0812 3854 634 812". The description "Bank USA PAYMNT CREDIT CRD 0812 3854 634 812" is neither in the user categorization preferences (450) in FIG. 7B nor in the collaborative categorization data (460) in FIG. 7C. Thus, the financial management system proceeds to check the merchant listing. First, the financial management system may normalize the vendor's name in the description. Specifically, "PAYMNT" may be changed to "Payment" and "CRD" may be changed to "Card". Further, extraneous character "0812 3854 634 812" may be removed. In the example, the normalized vendor name becomes "Bank USA Payment Credit Card".

The normalized vendor name may be compared with each merchant in the merchant list (482) of FIG. 7D to determine whether merchant in the merchant list directly matches the normalized vendor name. Since a direct match is not in the merchant list, a substring match may be performed in the example in accordance with one or more embodiments of the invention. For example, the merchant list may be filtered to remove merchants that most likely do not match the merchant. The filtered list may have "Best Luck Inn" and "Bank USA".

A substring match may be performed on the filtered list. The result of the substring match in the example may associate "Best Luck Inn" with a quality of no match found and "Bank USA" with a quality of best match. Specifically, "Best Luck Inn" is not contained in the normalized vendor name. "Bank USA" starts the normalized vendor name and therefore has a best match associated with the quality indicator. The category "transfer" that is associated with "Bank USA" is assigned to financial transaction in line 3 (414) having the description "Bank USA PAYMNT CREDIT CRD 0812 3854 634 812" as shown in FIG. 7H. Also, similar financial transactions are assigned the same category. Specifically, "Bank USA PAYMNT CREDIT CRD 5256 4896 486 431", which only differs by numbers in the extraneous characters in line 4 (416) is assigned the category "transfer". Also, as shown in FIG. 7H, financial transactions in line 10 (428) and line 12 (432) are also assigned the category "transfer".

As shown by the categorization of "Bank USA PAYMNT CREDIT CRD 0812 3854 634 812", by categorizing by the merchant list and performing sub-string matches, financial transactions that otherwise may not be able to be categorized automatically can be categorized. Further, by using a level approach, individuals who are closer to the financial transaction, either because the individuals is the user or has been a customer of the vendor, may have a greater impact in how the financial transaction is categorized than the creator of the generic merchant list in accordance with one or more embodiments of the invention.

Continuing with the example, the next financial transaction is "Samson's Supermarket" in line 5 of FIG. 7H. Similar to "Best Luck Inn" and "Jeffrey's Automotive", "Samson's Supermarket" is not in the user categorization preferences (450) in FIG. 7B. Thus, "Samson's Supermarket" is compared with the collaborative categorization data (460) shown in FIG. 7C. "Samson's Supermarket" is in line 5 (480) of the collaborative categorization data (460) and is associated with the categories "Supermarket" and "Bakery". Because "Supermarket" has a higher score, "Samson's Supermarket" is assigned the category "Supermarket" in line 5 (418), as shown the example FIG. 7I. Since the description "Samson's Supermarket" is also in line 9 (426), "Samson's Supermarket" in line 9 (426) is also assigned the category "Supermarket" as shown in FIG. 7I.

The next financial transaction is "Houston's Furniture Store" in line 6 of FIG. 7I. "Houston's Furniture Store" is not in the user categorization preferences (450) in FIG. 7B. Thus, "Houston's Furniture Store" is compared with the collaborative categorization data (460) shown in FIG. 7C. "Houston's Furniture Store" is in line 4 (478) of the collaborative categorization data (460) and is associated with the categories "Retail" and "Repair". Because "Retail" has a higher score, "Houston's Furniture Store" is assigned the category "Retail" in line 6 (420), as shown the example FIG. 7J. Since the description "Houston's Furniture Store" is also in line 13 (434), "Houston's Furniture Store" in line 13 (434) is also assigned the category "Retail" as shown in FIG. 7J.

The next uncategorized financial transaction is "Delicious Dessert Diner" in line 7 (422) of FIG. 7J. After attempting to classify the financial transaction using the user categorization preferences (450) in FIG. 7A, the collaborative categorization data (460) in FIG. 7B, and the merchant list (482) in FIG. 7C, no category is assigned to the financial transaction. Accordingly, the financial management system may attempt to categorize the financial transaction using the term based categorization data (490) in FIG. 7E. First, the financial management system may obtain the keyset having the following key phrases: "Delicious", "Dessert", "Delicious Dessert", "Dessert Diner", and "Diner" from the vendor name. Next, the financial management system may compare each of the key phrases in the key set with the term-based categorization data (490). Only one match (i.e., "Diner") is found. The category associated with "Diner", namely "restaurant" is assigned to the vendor name "Delicious Dessert Diner" as shown in line 7 (422) of FIG. 7K.

The next uncategorized financial transaction is "Happy Frog Store" in line 11 of FIG. 7K. "Happy Frog Store" may be a small shop where an account owner made a purchase while traveling. Accordingly, "Happy Frog Store" is not in the user categorization preferences (450) in FIG. 7B. Thus, "Happy Frog Store" is compared with the collaborative categorization data (460) shown in FIG. 7C. "Happy Frog Store" is in line 3 (476) of the collaborative categorization data (460) and is associated with the category "gift shop". Specifically, other users familiar with "Happy Frog Store" may have categorized the small vendor according to "gift shop". "Happy Frog Store" is, therefore, assigned the category "gift shop" as shown in line 11 (430) in the example FIG. 7L. Thus, although the user may not remember what "Happy Frog Store" is, other users may be able to provide the category.

The next uncategorized financial transaction is "FIT MEM DUE" in line 15 of FIG. 7L. Since the user categorized "FIT MEM DUE" as shown in the user categorization preferences (450) of FIG. 7B, deference is given to the user. As shown in FIG. 7B, the most recent assigned category for "FIT MEM DUE" is "gym membership" as shown by timestamp. Accordingly, "FIT MEM DUE" is assigned the category "gym membership" as shown in line 15 (438) of FIG. 7M.

The final uncategorized financial transaction is "The Bistro at Swan Inn" in line 16 (440) of FIG. 7M. After attempting to classify the financial transaction using the user categorization preferences (450) in FIG. 7A, the collaborative categorization data (460) in FIG. 7B, and the merchant list (482) in FIG. 7C, no category is assigned to the financial transaction. Accordingly, the financial management system may attempt to categorize the financial transaction using the term based categorization data (490) in FIG. 7E. First, the financial management system may obtain the keyset having the following key phrases: is "The", "Bistro", "at", "Swan", "Inn", "The Bistro", "at Swan Inn", "The Bistro at" "Swan Inn", "The Bistro at Swan", "Inn", etc. from the vendor name. Next, the financial management system may compare each of the key phrases in the key set with the term-based categorization data (490). "Bistro" and "Inn" are both in the term based categorization data (490). However, because "Bistro" is a longer word, "Bistro" may be assigned a higher score than "Inn" Accordingly, the category associated with "Bistro", namely "restaurant" is assigned to the vendor name "The Bistro at Swan Inn" shown in line 16 (440) of FIG. 7N.

At this stage in the example, the financial management system may present the transaction listing (400) to the user. The user, after reviewing the categories may decide to update the categories. For example, as shown in FIG. 7P, the user may update the category for "Samson's Supermarket" in line 5 (418) and in line 9 (426) because the user buys only bread at "Samson's Supermarket".

As a result of the user's update, the user categorization preferences (450) as shown in line 3 (457) of FIG. 7Q is updated with the new assignment. Further, a timestamp is added to reflect the time in which the newly assigned category is assigned to the description. Also, as shown in line 5 (480) of FIG. 7R, the collaborative categorization data (460) is updated to reflect that an additional user assigns the category "bakery" to "Samson's Supermarket". In the example, if the user later changes assignment of "bakery" to "Samson's Supermarket", the collaborative categorization data (460) is not updated.

As shown by the above example, embodiments of the invention allow for the categorization of financial transactions across different levels of categorization. The levels may be ordered in order to ensure that the user is most likely to agree with the scheme used to perform the categorization of the financial transaction. The above example is for explanatory purposes only. Alternatives and variations may be performed without departing from the scope of the invention.

Figure 8:
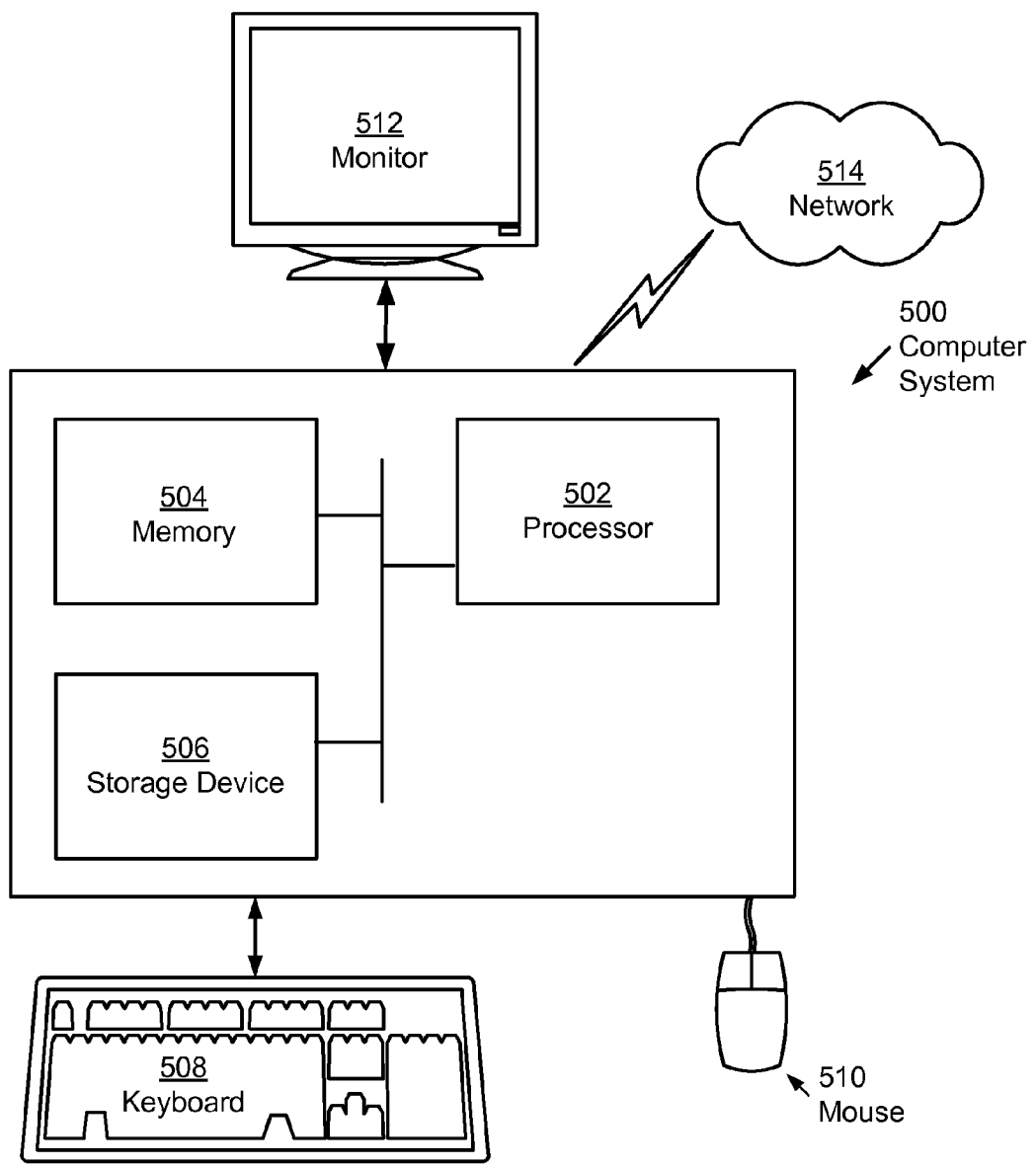
FIG. 8 shows a computer system in accordance with one or more embodiments of the invention.

Embodiments of the invention may be implemented on virtually any type of computer regardless of the platform being used. For example, as shown in FIG. 8, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., financial management system, data repository, user interface, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for categorizing financial transactions, comprising:
   identifying a vendor of the first financial transaction;
   performing a first operation to categorize the financial transaction according to a first categorization level;
   identifying the financial transaction as unable to be categorized by the first categorization level after performing the first operation, wherein the first categorization level complies with a first categorization scheme;
   performing a second operation to categorize the first financial transaction according to a second categorization level based on the identification of the financial transaction as unable to be categorized according to the first categorization level, wherein the second categorization level complies with a second categorization scheme;
   identifying the financial transaction as unable to be categorized by the second categorization level after performing the second operation;
   categorizing the first financial transaction according to a third categorization level to define the vendor category based on the identification of the financial transaction as unable to be categorized according to the second categorization level, wherein the third categorization level complies with a third categorization scheme;
   displaying the vendor category; and
   categorizing, with the vendor category, a second financial transaction associated with the same vendor as the first financial transaction,
   wherein the first categorization scheme differs from the second categorization scheme.

2. The method of claim 1, wherein the first categorization level is a user categorization preference level, wherein the user categorization preference level defines a plurality of user categorization preferences pre-assigned by the user for categorizing the financial transaction.

3. The method of claim 2, wherein the second categorization level is a collaborative categorization level, and wherein categorizing the financial transaction according to the collaborative categorization level comprises:
   identifying at least one category based the vendor of the financial transaction, wherein the at least one category is received from a plurality of users, wherein each of the at least one category is associated with a score; and
   selecting the vendor category from the at least one category based on the score.

4. The method of claim 3, wherein the third categorization level is a term based categorization level, wherein categorizing the first financial transaction according to term based categorization level comprises:
   generating a key set from a description of the vendor, wherein the key set comprises a plurality of key phrases;
   performing for each key phrase in the key set:
      accessing a data repository to identify a category of a plurality of categories to associate with the key phrase; and
      assigning a score to the category based on the association with the key phrase; and
   selecting the category with the highest score to define the vendor category.

5. The method of claim 1, wherein the third categorization level is one selected from a group consisting of a collaborative categorization level, a merchant list level, and a term based categorization level.

6. The method of claim 5, wherein categorizing the financial transaction according to the collaborative categorization level comprises:
   identifying at least one category based the vendor of the financial transaction, wherein the at least one category is received from a plurality of users, wherein each of the at least one category is associated with a score; and
   selecting the vendor category from the at least one category based on the score.

7. The method of claim 5, wherein categorizing the first financial transaction according to term based categorization level comprises:
   generating a key set from a description of the vendor, wherein the key set comprises a plurality of key phrases;
   performing for each key phrase in the key set:
      accessing a data repository to identify a category of a plurality of categories to associate with the key phrase; and
      assigning a score to the category based on the association with the key phrase; and
   selecting the category with the highest score to define the vendor category.

8. The method of claim 5, wherein categorizing the financial transaction according to the merchant list level comprises:
   normalizing a name of the vendor;
   determining whether the name is in a merchant list;
   identifying the vendor category corresponding to the name in the merchant list when the name is in the merchant list;
   categorizing the financial transaction with the vendor category when the name is in the merchant list; and
   performing a substring match when the name is not in the merchant list.

9. The method of claim 8, wherein performing the substring match comprises:
   filtering the merchant list to obtain a filtered list comprising a plurality of merchants;
   comparing, for each merchant of the plurality of merchants in the filtered list, the name of the vendor with the merchant to generate a quality indicator for the merchant;
   selecting an optimum merchant from the plurality of merchants based on the quality indicator associated with each merchant;
   identifying the vendor category corresponding to the optimum merchant;
   categorizing the financial transaction with the vendor category.

10. A computer system for categorizing financial transactions comprising:

a processor;
a memory; and
software instructions stored in memory for causing the computer system to:
identify a vendor of the first financial transaction;
perform a first operation to categorize the financial transaction according to a first categorization level;
identify the financial transaction as unable to be categorized by the first categorization level after performing the first operation, wherein the first categorization level complies with a first categorization scheme;
perform a second operation to categorize the first financial transaction according to a second categorization level based on the identification of the financial transaction as unable to be categorized according to the first categorization level, wherein the second categorization level complies with a second categorization scheme;
identify the financial transaction as unable to be categorized by the second categorization level after performing the second operation;
categorize the first financial transaction according to a third categorization level to define the vendor category based on the identification of the financial transaction as unable to be categorized according to the second categorization level, wherein the third categorization level complies with a third categorization scheme;
display the vendor category; and
categorize, with the vendor category, a second financial transaction associated with the same vendor as the first financial transaction,
wherein the first categorization scheme differs from the second categorization scheme.

11. The computer system of claim 10, wherein the first categorization level is a user categorization preference level, wherein the user categorization level defines a plurality of user categorization preferences pre-assigned by the user for categorizing the financial transaction.

12. The computer system of claim 11, wherein the second categorization level is a collaborative categorization level, and wherein categorizing the financial transaction according to the collaborative categorization level comprises:
identifying at least one category based the vendor of the financial transaction, wherein the at least one category is received from a plurality of users, wherein each of the at least one category is associated with a score; and
selecting the vendor category from the at least one category based on the score.

13. The computer system of claim 12, wherein the third categorization level is a term based categorization level, wherein categorizing the first financial transaction according to term based categorization level comprises:
generating a key set from a description of the vendor, wherein the key set comprises a plurality of key phrases;
performing for each key phrase in the key set:
accessing a data repository to identify a category of a plurality of categories to associate with the key phrase; and
assigning a score to the category based on the association with the key phrase; and
selecting the category with the highest score to define the vendor category.

14. The computer system of claim 10, wherein the third categorization level is one selected from a group consisting of a collaborative categorization level, a merchant list level, and a term based categorization level.

15. The computer system of claim 14, wherein categorizing the financial transaction according to the collaborative categorization level comprises:
identifying at least one category based the vendor of the financial transaction, wherein the at least one category is received from a plurality of users, wherein each of the at least one category is associated with a score; and
selecting the vendor category from the at least one category based on the score.

16. The computer system of claim 14, wherein categorizing the first financial transaction according to term based categorization level comprises:
generating a key set from a description of the vendor, wherein the key set comprises a plurality of key phrases;
performing for each key phrase in the key set:
accessing a data repository to identify a category of a plurality of categories to associate with the key phrase; and
assigning a score to the category based on the association with the key phrase; and
selecting the category with the highest score to define the vendor category.

17. The computer system of claim 14, wherein categorizing the financial transaction according to the merchant list level comprises:
normalizing a name of the vendor;
determining whether the name is in a merchant list;
identifying the vendor category corresponding to the name in the merchant list when the name is in the merchant list;
categorizing the financial transaction with the vendor category when the name is in the merchant list; and
performing a substring match when the name is not in the merchant list.

18. The computer system of claim 17, wherein performing the substring match comprises:
filtering the merchant list to obtain a filtered list comprising a plurality of merchants;
comparing, for each merchant of the plurality of merchants in the filtered list, the name of the vendor with the merchant to generate a quality indicator for the merchant;
selecting an optimum merchant from the plurality of merchants based on the quality indicator associated with each merchant;
identifying the vendor category corresponding to the optimum merchant;
categorizing the financial transaction with the vendor category.

19. The computer system of claim 10, further comprising:
a user interface configured to display the vendor category.

20. A computer readable medium comprising computer readable program code embodied therein for causing a computer system to:
identify a vendor of the first financial transaction;
perform a first operation to categorize the financial transaction according to a first categorization level;
identify the financial transaction as unable to be categorized by the first categorization level after performing the first operation, wherein the first categorization level complies with a first categorization scheme;
perform a second operation to categorize the first financial transaction according to a second categorization level based on the identification of the financial transaction as unable to be categorized according to the first categorization level, wherein the second categorization level complies with a second categorization scheme;

identify the financial transaction as unable to be categorized by the second categorization level after performing the second operation;

categorize the first financial transaction according to a third categorization level to define the vendor category based on the identification of the financial transaction as unable to be categorized according to the second categorization level, wherein the third categorization level complies with a third categorization scheme;

display the vendor category; and categorize, with the vendor category, a second financial transaction associated with the same vendor as the first financial transaction, wherein the first categorization scheme differs from the second categorization scheme.

21. The computer readable medium of claim 20, wherein the third categorization level is one selected from a group consisting of a collaborative categorization level, a merchant list level, and a term based categorization level.

22. The computer readable medium of claim 21, wherein categorizing the financial transaction according to the collaborative categorization level comprises:

identifying at least one category based the vendor of the financial transaction, wherein the at least one category is received from a plurality of users, wherein each of the at least one category is associated with a score; and selecting the vendor category from the at least one category based on the score.

23. The computer readable medium of claim 21, wherein categorizing the first financial transaction according to term based categorization level comprises:

generating a key set from a description of the vendor, wherein the key set comprises a plurality of key phrases;

performing for each key phrase in the key set:

accessing a data repository to identify a category of a plurality of categories to associate with the key phrase; and assigning a score to the category based on the association with the key phrase; and selecting the category with the highest score to define the vendor category.

24. The computer readable medium of claim 21, wherein categorizing the financial transaction according to the merchant list level comprises:

normalizing a name of the vendor;

determining whether the name is in a merchant list;

identifying the vendor category corresponding to the name in the merchant list when the name is in the merchant list;

categorizing the financial transaction with the vendor category when the name is in the merchant list; and performing a substring match when the name is not in the merchant list.

25. The computer readable medium of claim 24, wherein performing the substring match comprises:

filtering the merchant list to obtain a filtered list comprising a plurality of merchants;

comparing, for each merchant of the plurality of merchants in the filtered list, the name of the vendor with the merchant to generate a quality indicator for the merchant;

selecting an optimum merchant from the plurality of merchants based on the quality indicator associated with each merchant;

identifying the vendor category corresponding to the optimum merchant;

categorizing the financial transaction with the vendor category.

* * * * *